United States Patent [19]
Hutchison et al.

[11] Patent Number: 6,039,637
[45] Date of Patent: *Mar. 21, 2000

[54] SECURITY DEVICE FOR DESTROYING THE INFORMATION BEARING LAYER AND DATA OF A COMPACT DISC

[75] Inventors: Roger S. Hutchison, Golden, Colo.; Phua Swee Hoe, Singapore, Singapore

[73] Assignee: CD-Rom USA, Inc., Golden, Colo.

[*] Notice: This patent is subject to a terminal disclaimer.

[21] Appl. No.: 09/192,062

[22] Filed: Nov. 13, 1998

Related U.S. Application Data

[63] Continuation-in-part of application No. 09/079,579, May 15, 1998, Pat. No. 5,954,569.

[51] Int. Cl.[7] .................................................. B24B 7/00
[52] U.S. Cl. ................................ 451/271; 451/28; 451/63
[58] Field of Search ................................ 451/63, 28, 271

[56] References Cited

U.S. PATENT DOCUMENTS 5,690,542  11/1997  Ikemoto ..................... 451/63

*Primary Examiner*—David A. Scherbel
*Assistant Examiner*—Shantese McDonald
*Attorney, Agent, or Firm*—John Isaac; Jessica Clement

[57] ABSTRACT

A device is disclosed for removing the information bearing surface and the data carried thereby from the substrate layer of a compact disc. The device includes a housing which has a first portion having an inner surface defining a first chamber. A second housing portion is selectively securable to the first housing portion to enclose the first chamber. A mechanism is provided for selectively mounting a compact disc within the first chamber. An apparatus is disposed within the chamber for removing the information bearing surface from the substrate layer of a compact disc positioned on the mounting mechanism by physically converting the information bearing surface to particulate material. The removal apparatus is biased against the information-bearing surface of a compact disc positioned on the mounting mechanism as the information-bearing surface is reduced to particulate material. Finally, a mechanism is provided for selectively actuating the physical removal apparatus within the first chamber.

40 Claims, 24 Drawing Sheets

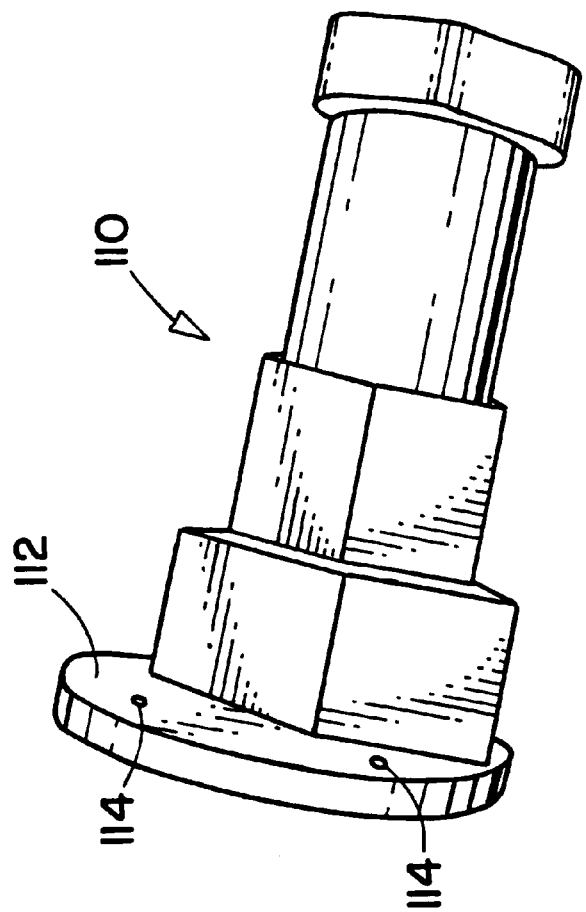
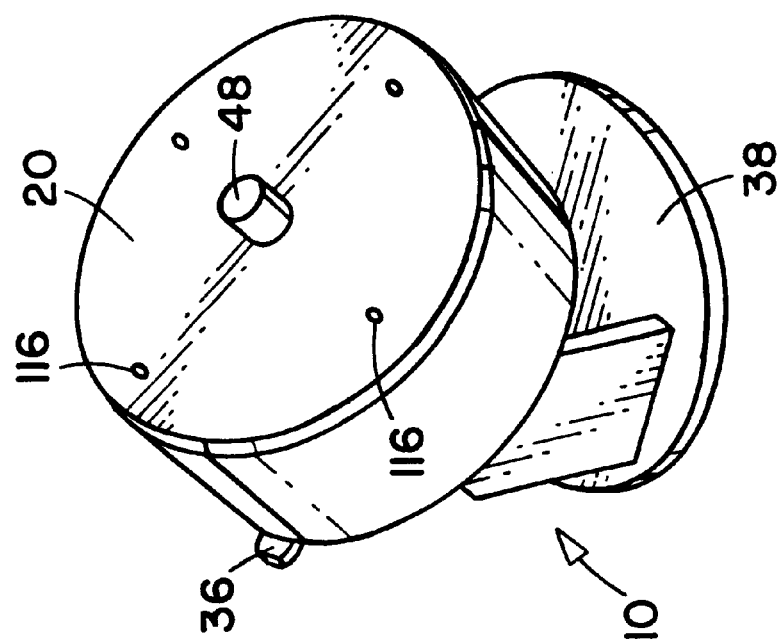
FIG. 9

SECURITY DEVICE FOR DESTROYING THE INFORMATION BEARING LAYER AND DATA OF A COMPACT DISC

RELATED APPLICATION

This is a continuation-in-part of U.S patent application Ser. No. 09/079,579, filed May 15, 1998, now U.S. Pat. No. 5,954,569 the contents of which are specifically incorporated herein by reference.

BACKGROUND OF THE INVENTION

1. Field of the Invention

This invention relates, generally, to security related devices for destroying industrial and government proprietary and confidential information and, more particularly, to devices adapted for destroying information contained on compact disc media. Specifically, the present invention relates to devices designed to completely destroy information and data contained on compact discs which devices are quick and convenient to operate while being highly dependable and efficient.

2. Description of the Prior Art

Corporate and government security procedures have long utilized destruction techniques and devices to prevent the unnecessary storage and unauthorized distribution of sensitive or confidential information. Such destruction frequently takes place routinely according to pre-determined time schedules as well as in emergency situations. Previously, incinerators as well as paper shredders of various sizes and speeds have been utilized to destroy government or corporate proprietary and confidential information both routinely as well as during emergency situations, such as during the takeover of the U.S. Embassy in Tehran or on board U.S. warships. Unfortunately, the mere volume of such confidential paper documents prohibits an effective emergency destruction process. Moreover, even paper shredders having very fine shredding capability are not entirely effective in preventing the reconstruction of the documents and retrieval of at least some of the information contained therein. This, too, became apparent during the Tehran incident.

With an ever-growing demand for compact disc related products as well as the continuing increase in data storage capacity, of such discs, businesses and government agencies are placing more and more sensitive and corporate-confidential information on compact discs (CD's). While such compact and efficient data storage media has significantly reduced the volume problem associated with prior confidential paper documents as discussed above, such compact disc storage has created problems of its own, such as how to destroy a compact disc or at least the information contained thereon once it has been created.

In response to this ever-increasing media storage form, the Department of Defense (DOD) has issued secure destruction standards for compact disc media. Specifically, DOD requires that when the information-bearing surface (IBS) of a CD is altered to the extent that no exploitable information can be recovered, then the CD is considered securely destroyed. The principal goal of any destruction process for compact discs is to assure that no exploitable information can be recovered from the information-bearing layer of the compact disc. If a destruction process consumes the entire compact disc, the resulting particles can be no larger than 0.25 mm or 250 microns in any dimension. Alternatively, if the destruction process destroys only the information bearing surface layer of the compact disc, then the dimensions of the resulting particulate residue cannot be greater than 0.25 mm or 250 microns, while the remaining polycarbonate substrate layer cannot be greater than 1.05 mm±0.03 mm thick.

To date, the only known device specifically designed to declassify or securely destroy compact discs by removing the information contained thereon is a 50+ pound tower device manufactured and sold by Security Engineered Machinery Company of Westboro, Mass. This device is intended to cut and pulverize entire compact discs and is of sufficient weight and size to prevent easy mobility let alone field use. Moreover, it is electronic and therefore requires a power source to be operative. Thus, there remains a need in the industry for a device which quickly and efficiently removes the information bearing surface of a compact disc in particulate sizes meeting at least DOD's minimum requirements yet retains the base substrate layer with its identification tag in-tact for reuse. Moreover, there is still a requirement for a CD declassification or destruction device which is portable, which can be used without external power, and thus is capable of autonomous field use such as with mobile military units, Naval vessels, aircraft and the like, or when there is a power failure.

SUMMARY OF THE INVENTION

Accordingly, it is one object of the present invention to provide a device for removing proprietary and confidential information from a compact disc.

It is another object of the present invention to provide such a device which can be operated quickly yet assures complete destruction of the information or data contained on a compact disc.

Still another object of the present invention is to provide such a device, which is lightweight and field portable yet capable of both manual as well as motorized operations.

To achieve the foregoing and other objects and in accordance with the purposes of the present invention, as embodied and broadly described herein, a device is disclosed for removing the information bearing surface and the data carried thereby from the substrate layer of a compact disc. The device includes a housing which has a first portion having an inner surface defining a first chamber. A second housing portion is selectively securable to the first housing portion to enclose the first chamber. A mechanism is provided for selectively mounting a compact disc within the first chamber. An apparatus is disposed within the chamber for removing the information bearing surface from the substrate layer of a compact disc positioned on the mounting mechanism by physically converting the information bearing surface to particulate material. The removal apparatus is biased against the information-bearing surface of a compact disc positioned on the mounting mechanism as the information-bearing surface is reduced to particulate material. Finally, a mechanism is provided for selectively actuating the physical removal apparatus within the first chamber.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 9 is a side schematic view of a motorized first embodiment of the present invention with the motor detached therefrom;

DETAILED DESCRIPTION OF THE PREFERRED EMBODIMENTS

Figure 1:
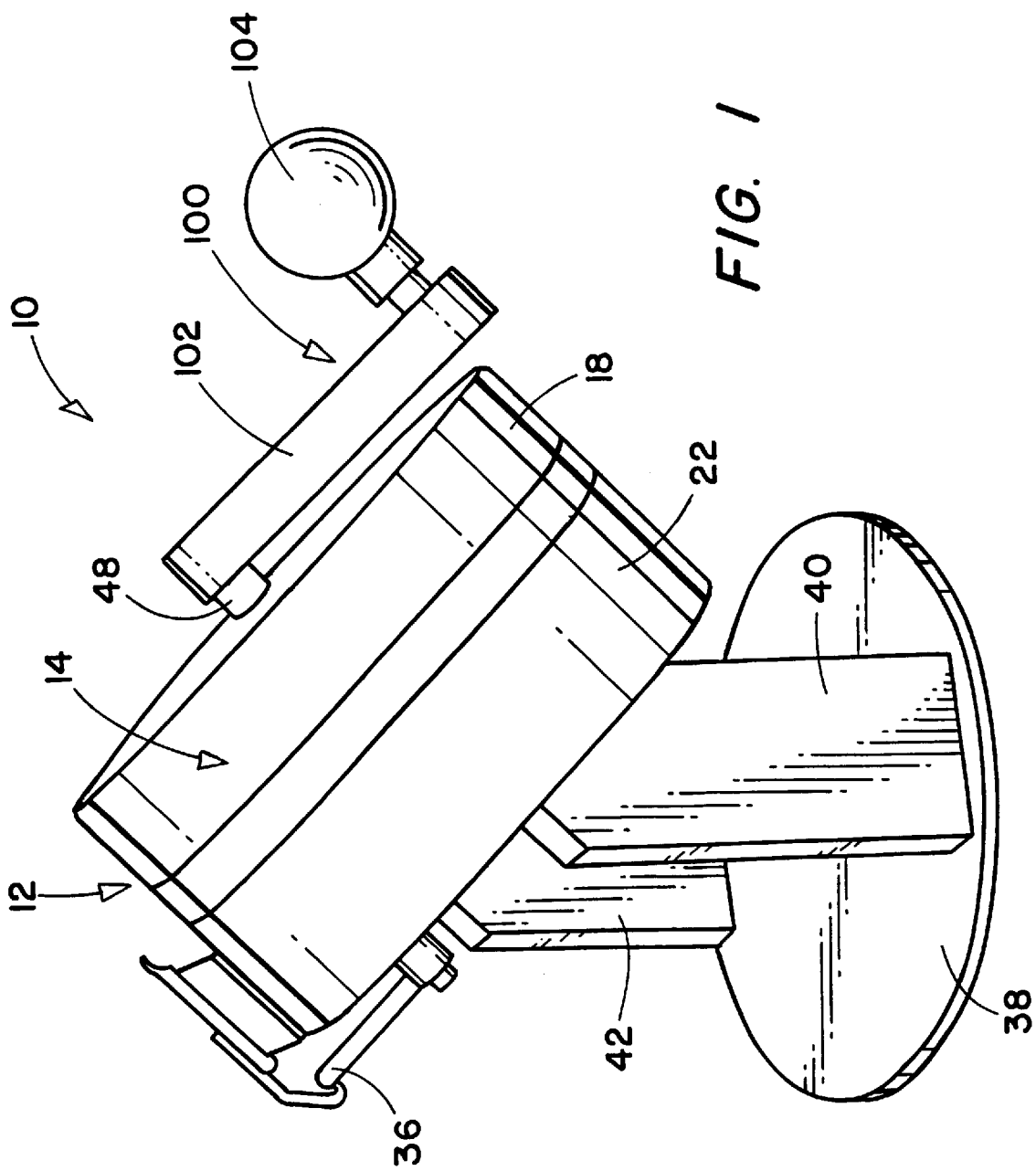
FIG. 1 is a side perspective view of a first embodiment of the present invention arranged in operational position.
Figure 2:
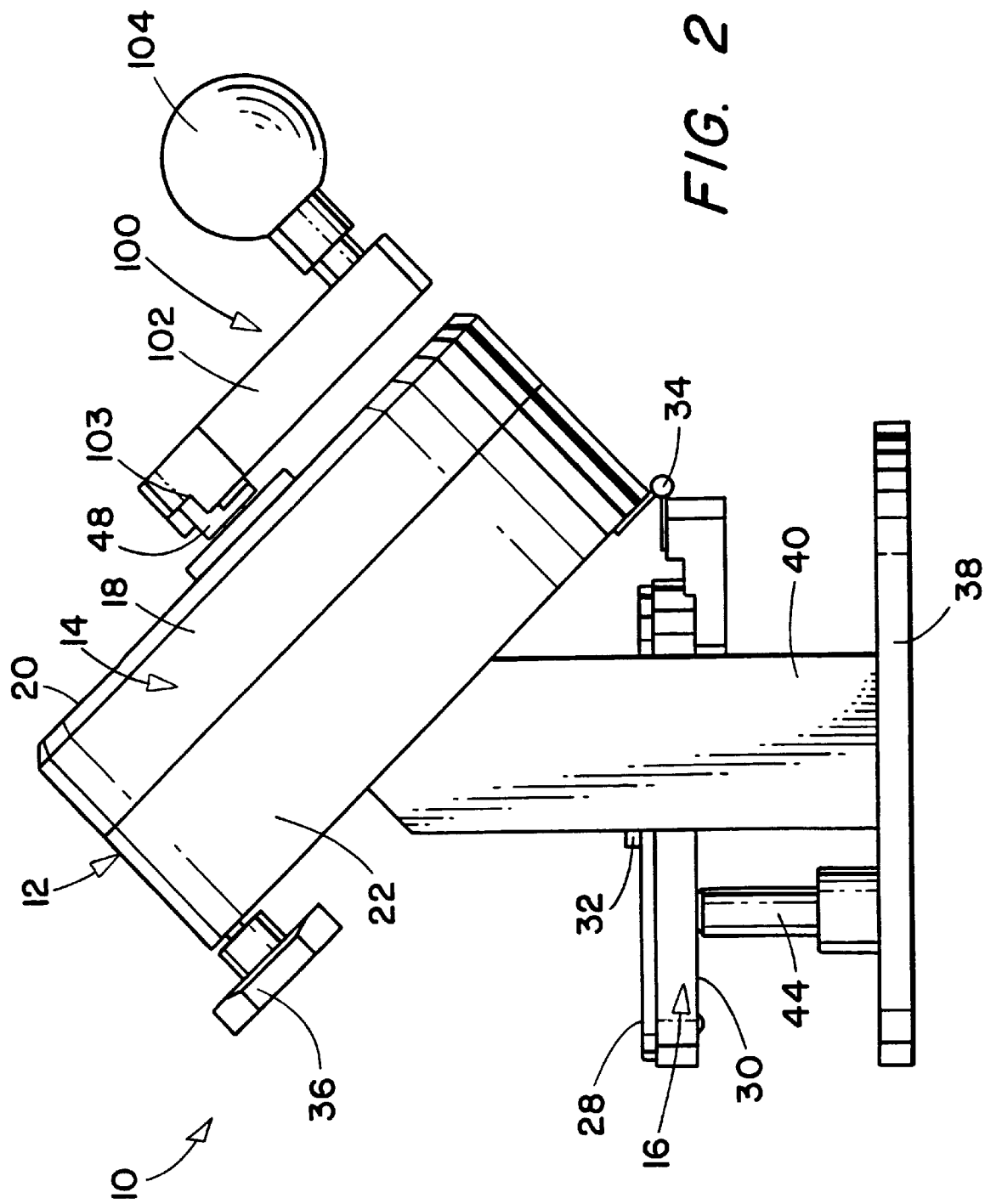
FIG. 2 is a side perspective view of the embodiment shown in FIG. 1 but illustrating the present invention in an open, loading position for receiving a CD.
Figure 3:
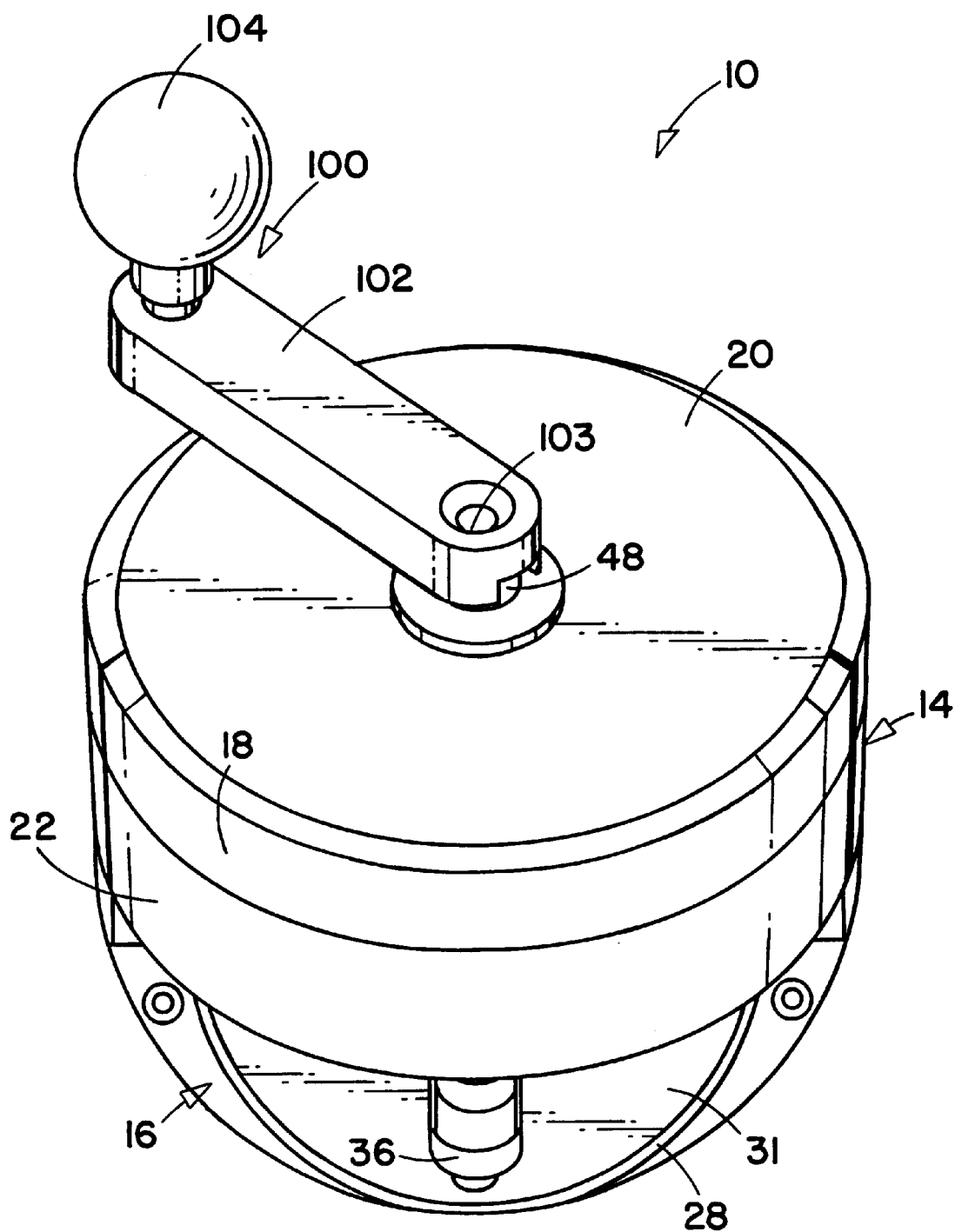
FIG. 3 is a top perspective view of the embodiment illustrated in FIG. 2.
Figure 4:
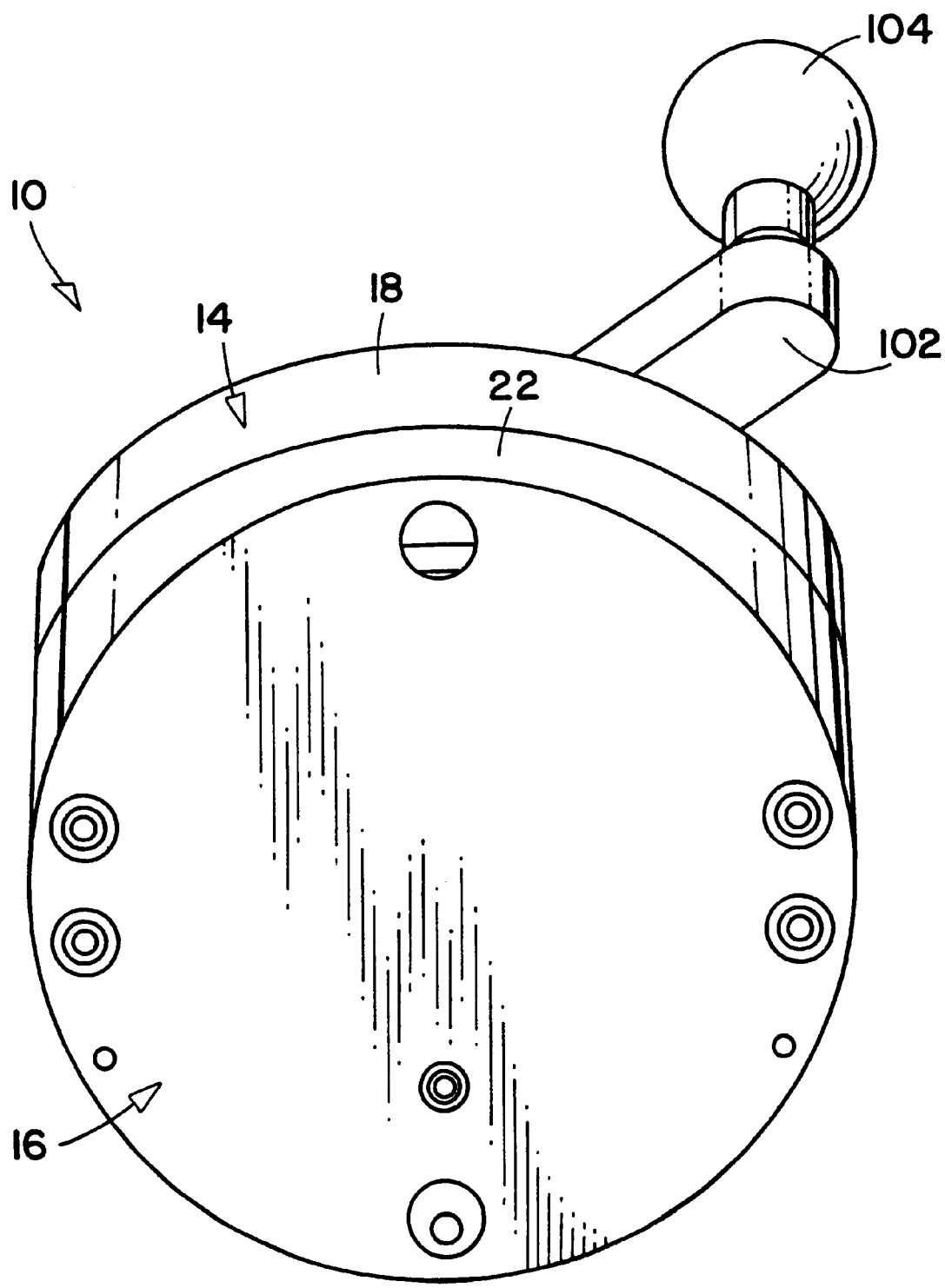
FIG. 4 is a bottom perspective view of the embodiment illustrated in FIG. 2.

Since the beginning of the CD-ROM and CDR industry, there has been a need to destroy the information and data carried by the compact disc as previously discussed. To date, there has been a distinct lack of lightweight or portable units available to the military or to such diverse businesses as banks and large corporations that publish confidential and sensitive information on CD-ROMs and which would enable such entities to accomplish the important objective of destroying the compact discs once their usefulness has expired. As previously indicated, the Department of Defense (DOD) has issued destruction standards for compact disc media. Whether the entire disc is destroyed or just the information bearing surface thereof, the resultant information-containing particulate material must be at least 250 microns or less in size. Otherwise, electron microscopy can be utilized to extract data and information from particles larger than this. Moreover, it is also highly desirable to be able to save the polycarbonate substrate layer of the compact disc for subsequent reuse as well as positive identification for documenting the CD destruction. The device of the present invention accomplishes both of these very important functions.

It should be understood that the term "compact disc" as used herein and in the claims attached hereto is not to be limited merely to the common understanding of this term "compact disc" or "CD". Rather, it is understood to include field upgradable forms of optical media including but not limited to commercially produced CD-ROM, commercially produced DVD-ROM, CD-R, DVD-R, DVD, DVD9, DVD-RAM, DVD-ROM, DVD-Erasable, DVD-Rewritable and other forms of optical media.

Referring initially to FIGS. 1–5, one preferred embodiment of the present invention is illustrated. In this preferred form, the device 10 includes a housing 12 having a first or upper member or portion 14 and a second or lower member 16. The first portion 14 is preferably circular in shape and includes a top section 18 having an upper surface 20 and a bottom section 22. The top section 18 is secured to the bottom section 22 in any desired manner and preferably by utilizing bolts passing through the apertures 24. In preferred form, the housing 12 is made from stainless steel and defines a central cavity 26 therewithin having an open lowermost end.

The second housing member 16 includes an interior surface 28 and an exterior surface 30. The interior surface 28 is preferably sized and shaped to receive a compact disc 31 thereon aligned about a central guide pin 32. The second or lower housing member 16 is selectively attachable to the first member 14 and is preferably hinged thereto by a hinge member 34. When the second housing member 16 is closed against the first member 14, it is preferably locked in position by a lock element 36 which may be of any desired design. In this manner, when the second or lower member 16 is so closed against the first or upper housing member 14, the interior surface 28 and any CD 31 disposed thereon become encased within the now enclosed cavity 26.

In preferred form, the housing 12 is mounted to a stand 38 by a pair of brackets 40, 42. A pedestal element 44 braces the exterior surface 30 of the lower housing member 16 when the member 16 is unsecured to the upper member 12. In this manner, the interior surface 28 is readily accessible to position a CD 31 thereon while maintaining the lower member 16 in substantially parallel form to the stand 38 as particularly illustrated in FIG. 2.

Figure 5:
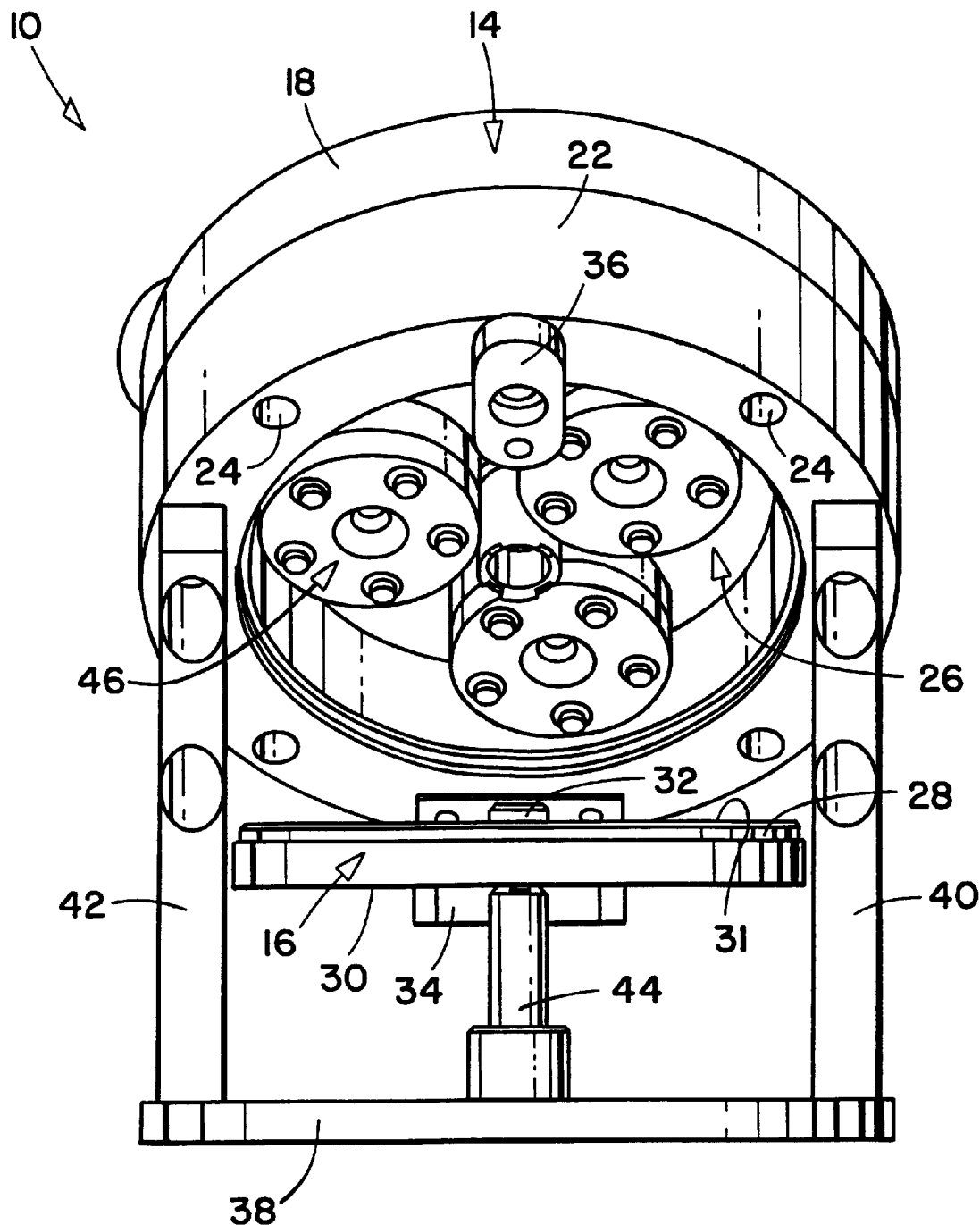
FIG. 5 is a front perspective view of the embodiment illustrated in FIG. 2 particularly illustrating one embodiment of the IBS grinding mechanism utilized in the present invention.
Figure 6:
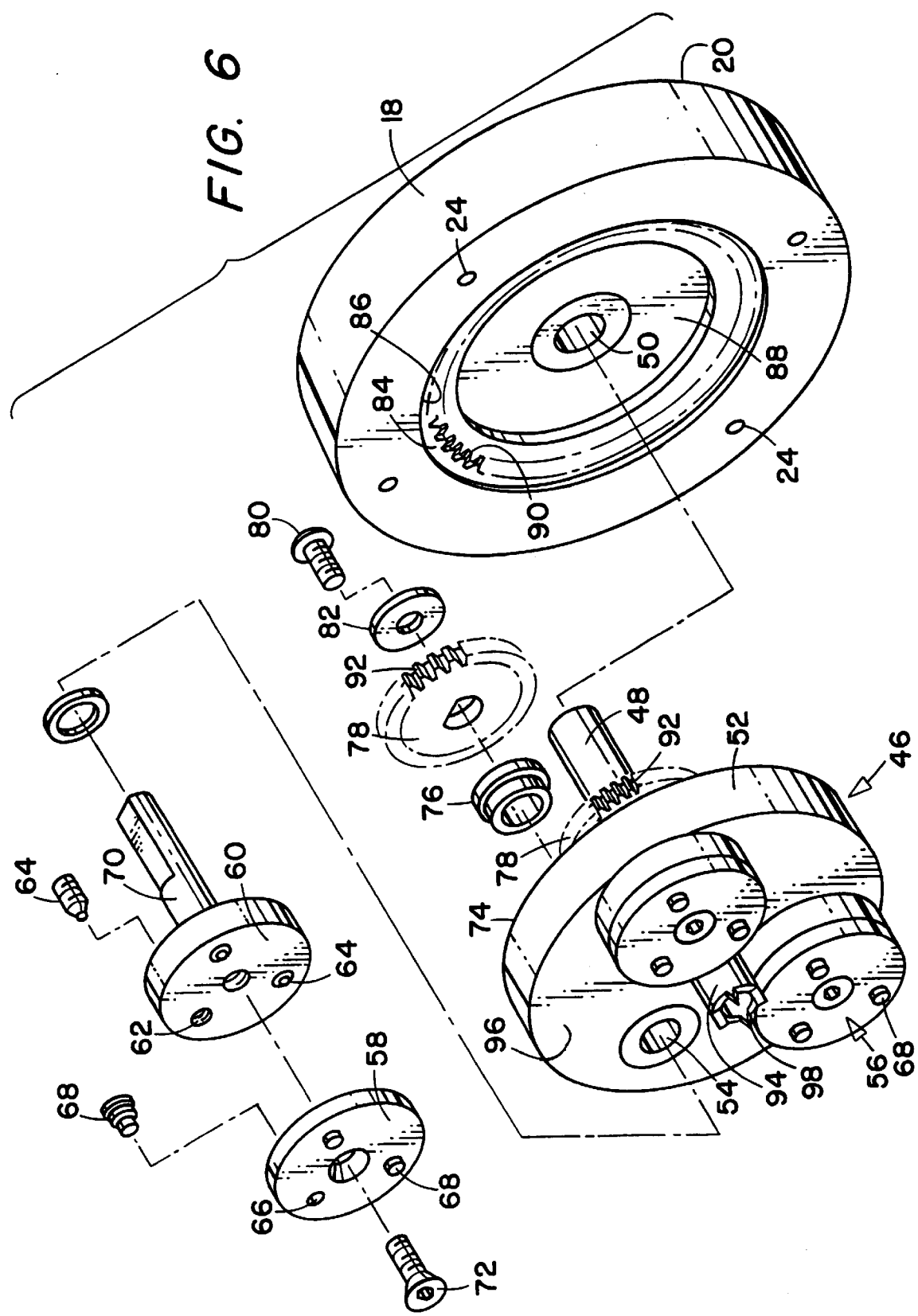
FIG. 6 is an exploded view illustrating the various components of the first embodiment of the present invention.

Referring with more particularity to FIGS. 5 and 6, the cavity 26 houses the mechanism 46 for physically removing the information bearing surface (IBS) layer of a compact disc 31 by physically converting the IBS layer to particulate material. This occurs when the disc 31 is positioned on the interior surface 28, and the lower member 16 is secured to the upper member 12 as shown in FIG. 1. In preferred form, the mechanism 46 is adapted to grind the IBS layer away from the substrate layer of a CD 31. While any number of abrasion or grinding arrangements may be utilized within the cavity 26 to accomplish the purposes of the present invention and are thus envisioned as being within the scope of the invention, one preferred arrangement and embodiment is discussed and disclosed immediately below. However, it should be understood that the scope of the present invention shall not be limited to the particular configurations of the below-described preferred embodiments.

To accomplish the above abrasion function, the mechanism 46 in one form preferably includes a central shaft 48 which is sized to pass through a central aperture 50 defined in the top section 18 and attached to a drive mechanism to be discussed in greater detail below. The drive mechanism is designed to selectively rotate the shaft 48 and anything connected thereto. In preferred form, the shaft 48 is attached to an annular mounting plate 52 which is positioned so as to freely rotate within the cavity 26. In preferred form, the plate 52 includes three substantially equally spaced apertures 54 therein. Each aperture 54 is designed to mount a head assembly 56.

Figure 7:
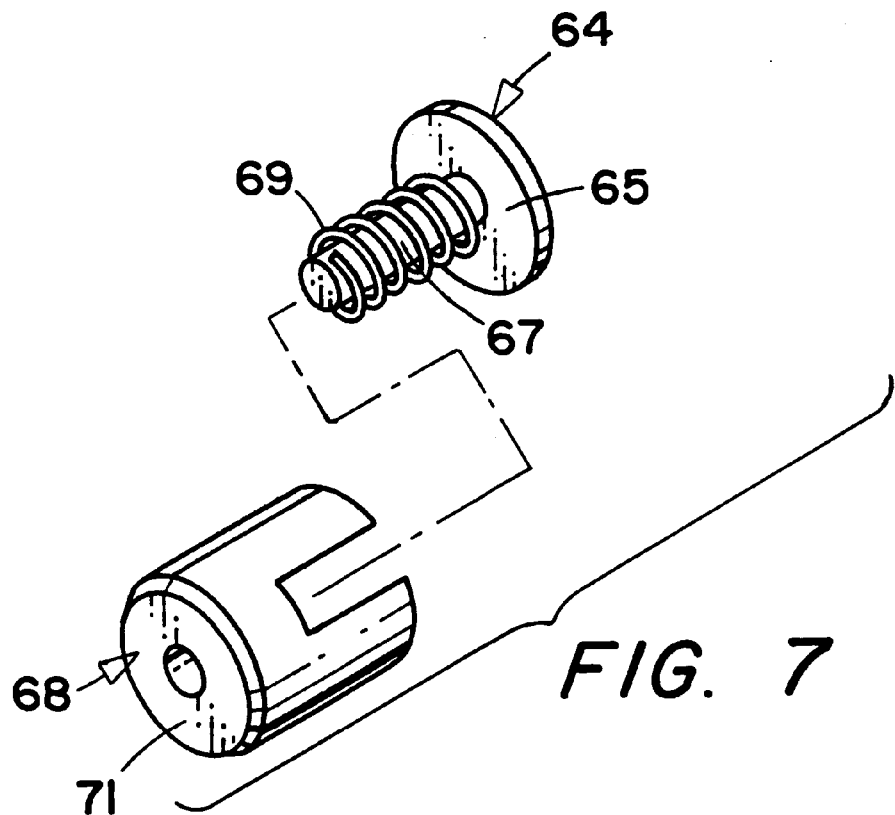
FIG. 7 is a schematic, exploded view of one grinding element embodiment utilized with the device of the present invention.
Figure 8:
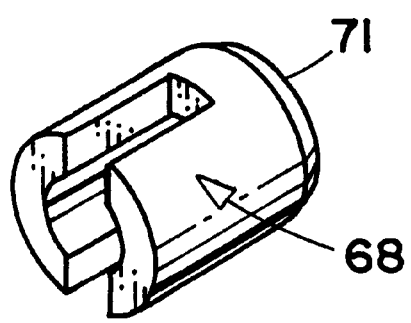
FIG. 8 is a rear perspective view of the grinding head portion of the embodiment illustrated in FIG. 7.

Each head assembly 56 preferably includes a pair of congruent disks 58 and 60. The bottom disk 60 includes a plurality of spaced apertures 62 which are sized and shaped to receive resilient spring members 64 therein. Likewise, the upper disk 58 includes a plurality of apertures 66 equal in number to the apertures 62 and are sized and shaped to receive grinding elements 68 therein. In preferred form, there are 3 to 6 grinding elements 68 and corresponding resilient members 64 for each head assembly 56. Another embodiment illustrating the grinding element 68 of the present invention is shown in FIGS. 7 and 8. In this instance, the resilient member 64 includes a pin 65 having a shaft 67 with a coil spring 69 disposed thereabout. The grinding element 68 is then mounted about the shaft 67 so that the coil spring 69 continually urges the top surface 71 toward a compact disc 31.

Referring back to FIGS. 5 and 6, an axle 70 depends from the bottom surface of the lower disk 60 and is sized for positioning and rotatable movement within an aperture 54 in the plate 52. The disks 58 and 60 are secured together by any known mechanism and preferably a screw member 72. At the bottom surface 74 of the plate 52, a spacer or washer member 76 is preferably positioned about the shaft or axle 70, and a gear 78 is securely fastened nonrotatably to the axle 70. The gear 78 and spacer 76 are maintained in position on the axle 70 by a screw attachment member 80 and washer 82. In this manner, there are three gear members 78 positioned beneath the bottom surface 74 of the plate 52 associated with the three head assemblies 56. It should be understood that the gears 78 are sized and spaced so as to not interact with each other.

A gear ring 84 is preferably positioned along the internal circumferential edge 86 of the cavity 26 toward the bottom 88 thereof. The gear ring 84 includes a plurality of teeth 90 projecting radially outwardly toward the centerline of the upper housing member 14. The gear ring 84 is preferably sized and shaped such that the teeth 90 interact with the teeth 92 of each gear 78. In this manner, when the shaft 48 is rotated in one direction, the interaction between the teeth 90 and that teeth 92 cause of the counter-rotation of each head assembly 56 thereby enabling the grinding elements 68 to provide maximum interaction and abrasion with the surface of a compact disc 31 positioned on the interior surface 28.

The size and spacing of the head assemblies 56 are such that the grinding elements 68, which in preferred form are jeweler's polishing stones, are in firm contact with the information bearing surface layer of the CD 31 when the second housing member 16 is closed and secured against the first housing member 14. The resilient members 64 may be of any desired type of resilient spring members that continually urge and bias the grinding elements 68 axially outwardly from the top disk 58 toward the compact disc 31.

In preferred form, a shank 94 extends axially outwardly from the upper surface 96 of the mounting plate 52 and includes pin contacts 98 which are designed for engagement with the center portion of a compact disc 31. In this manner, the compact disc 31 is maintained in a fixed position as the head assemblies 56 are rotated across the information-bearing surface thereof. It should be understood that the shank 94 does not rotate with the rotation of the mounting plate 52 thereby securing a CD 31 in position.

Figure 10:
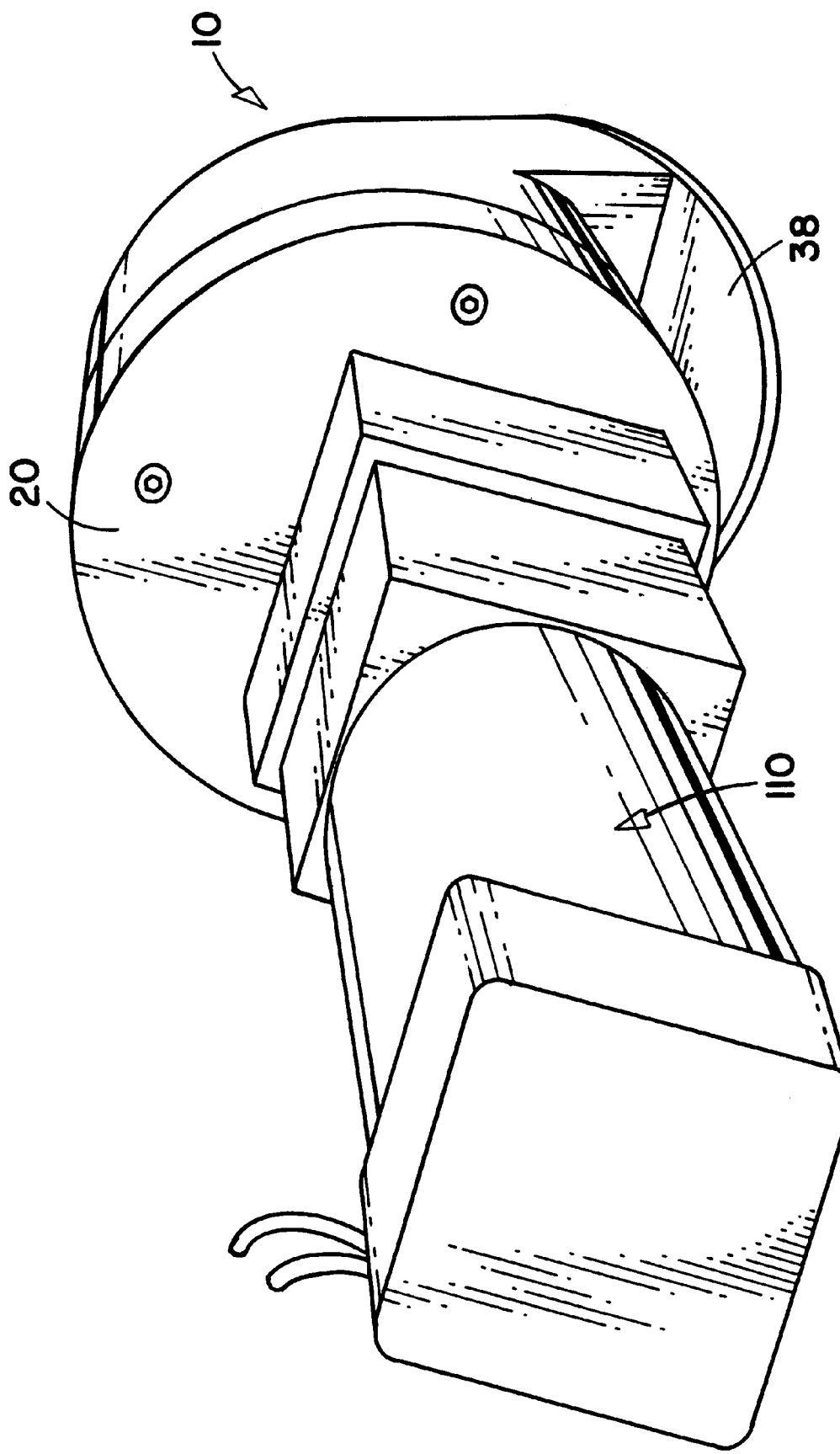
FIG. 10 is a rear perspective view of the fully assembled embodiment illustrated in FIG. 9.

As previously discussed, one primary benefit of the present invention is that it is field portable. In other words, the device 10 of the present invention does not require an external electrical power source for operation. In one preferred embodiment, and with particular reference to FIGS. 14, a hand crank 100 is utilized to rotate the shaft 48 and the grinding assembly 46. In preferred form, the hand crank 100 includes a crank arm 102 which is attached to the shaft 48 at 103 exteriorly to the surface 20. A handle 104 is secured to the opposite end of the crankshaft 102 and is provided for rotating the crank 100 about the shaft connection point 103. In an alternate embodiment, and with particular reference to FIGS. 9 and 10, a motor 110 may be utilized to turn the shaft 48 exterior to the top surface 20. The motor preferably 110 includes a mounting plate 112 which is bolted to the top surface 20 at connection points 114 and 116. The motor 110 can be a small electric motor powered by a field generator, or it can be a gasoline-powered motor of any desired size or shape. Nonetheless, even utilizing the motor embodiment of the present invention, the device 10 of the present invention is still field portable and does not require any substantial external electric power source.

As can be seen from the above, the present invention provides a security device particularly adapted to destroying the information bearing surface layer of a compact disc in a rapid and efficient manner. Utilizing the present invention, the information bearing surface layer of a CD can be reduced to particulate size of only 2 microns, which is two orders of magnitude less than the minimum 250 microns required by the Department of Defense. The embodiment of the present invention represented by the FIGS. 1–10 weighs only approximately 30 pounds and has a height of about 8 inches, a width of about 10 inches and depth of about 10 inches. Consequently, the device of present invention is lightweight and easily portable.

Referring now to FIGS. 11–32, another primary embodiment of the present invention is disclosed. Referring first to the FIGS. 11–17, the device 120 is also a device designed for removing the information bearing surface and the data carried thereby from the substrate layer of a compact disc. More specifically, the device 120 includes a housing 122 which is preferably made up of three main portions, specifically a first portion 124, a second portion 126 and a third portion 128. The first portion 124 is preferably in the form of a cover member which is attached to the second housing portion 126 by a hinge mechanism 130. In this manner, the first housing portion 124 is selectively securable to cover the first open end 132 of the second housing portion 126 to permit selective access to the interior thereof, which is a first chamber 134.

The second housing portion 126 is also secured at its second open end 136 (see FIG. 18) to the third housing portion 128. The second open end 136 communicates with the interior of the third housing portion 128, which interior is in the form of a second chamber 138 as described in greater detail below. The third housing portion 128 is removably secured to a base 139. A central shaft 140 runs axially through the housing 122 and terminates at one distal end 142 at the juncture between the first and second housing portions 124, 126 and at its other end at the motor member 144, which is mounted adjacent the base 139. The shaft 140 is adapted for rotation by an activation device which is preferably in the form of either the motor 144 or a hand crank 146.

The distal end 142 of the shaft 140 preferably includes a plurality of flexible tongs 144 which are sized and shaped to receive and capture the center aperture of a compact disc 31. A compact disc 31 is then selectively mounted to the distal end 142 to position the disc 31 within the chamber 134 for the destruction of its information bearing layer (IBS). An abrasion mechanism, as described below, is disposed within the chamber 134 in order to reduce the IBS layer to particulate material while simultaneously saving the substrate portion of the compact disc 31. The interior surface 146 of the first housing portion 124 is sized and shaped to engage the compact disc 31 when positioned on the distal end 142 as the first housing portion 124 is secured against the second housing portion 126 and held in place by releasable attachment members 148. In this manner, the compact disc 31 is biased against the abrasion mechanism by the interior surface 146.

Figure 11:
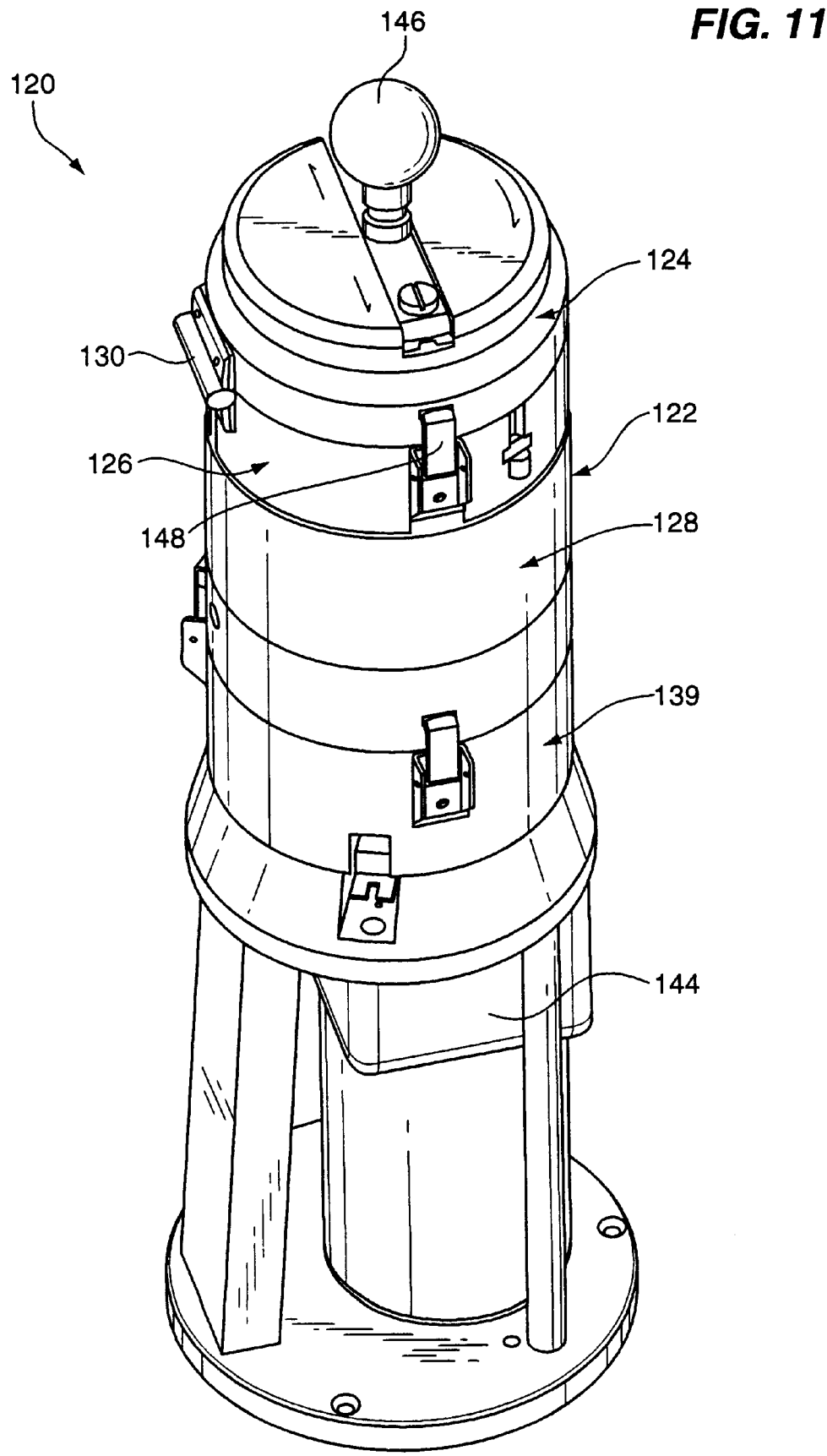
FIG. 11 is a side perspective view of a second embodiment of the present invention arranged in motorized operational position.
Figure 12:
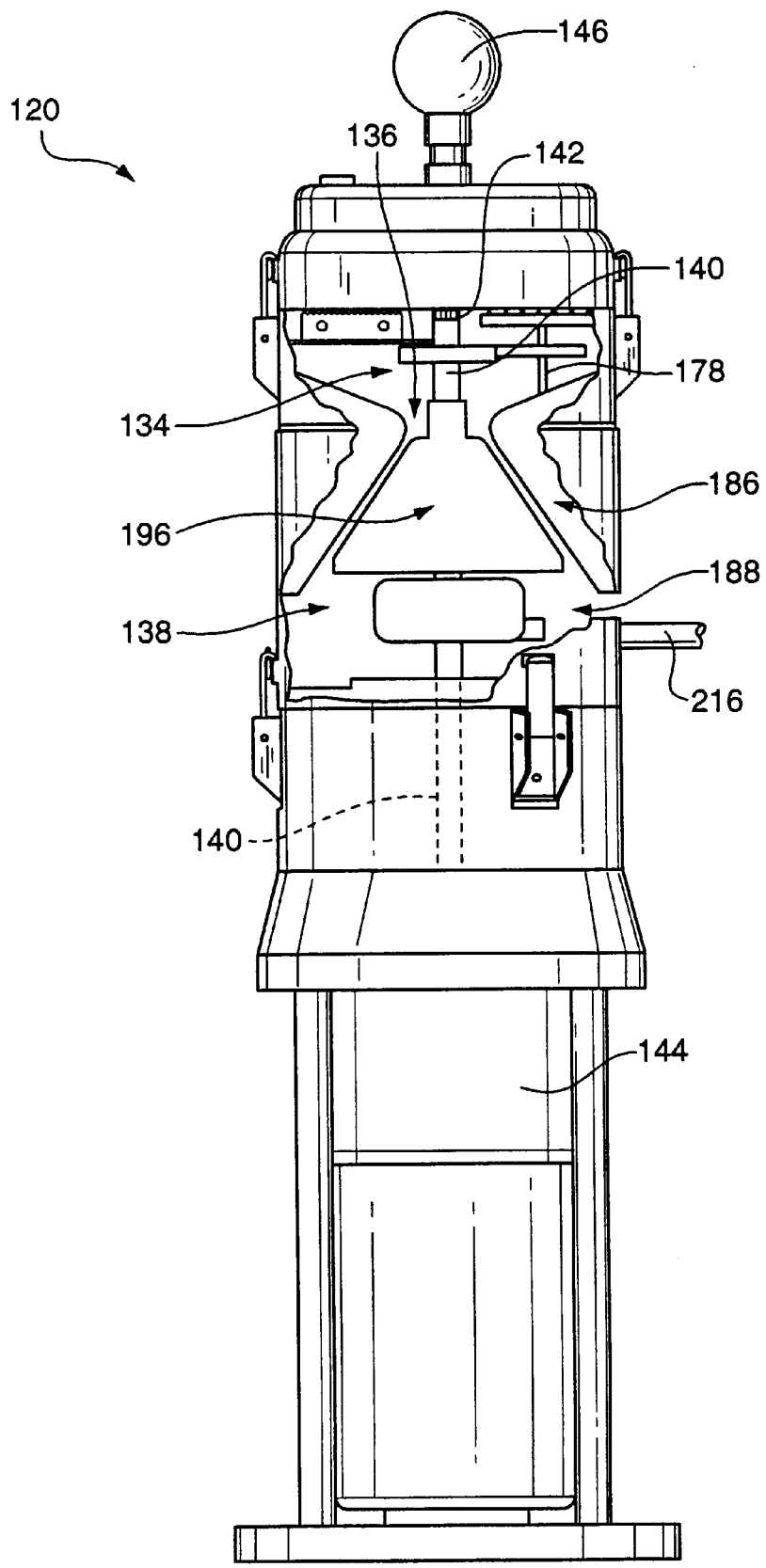
FIG. 12 is a side view, with parts in cross-section, of the second embodiment of the present invention illustrated in FIG. 1.
Figure 13:
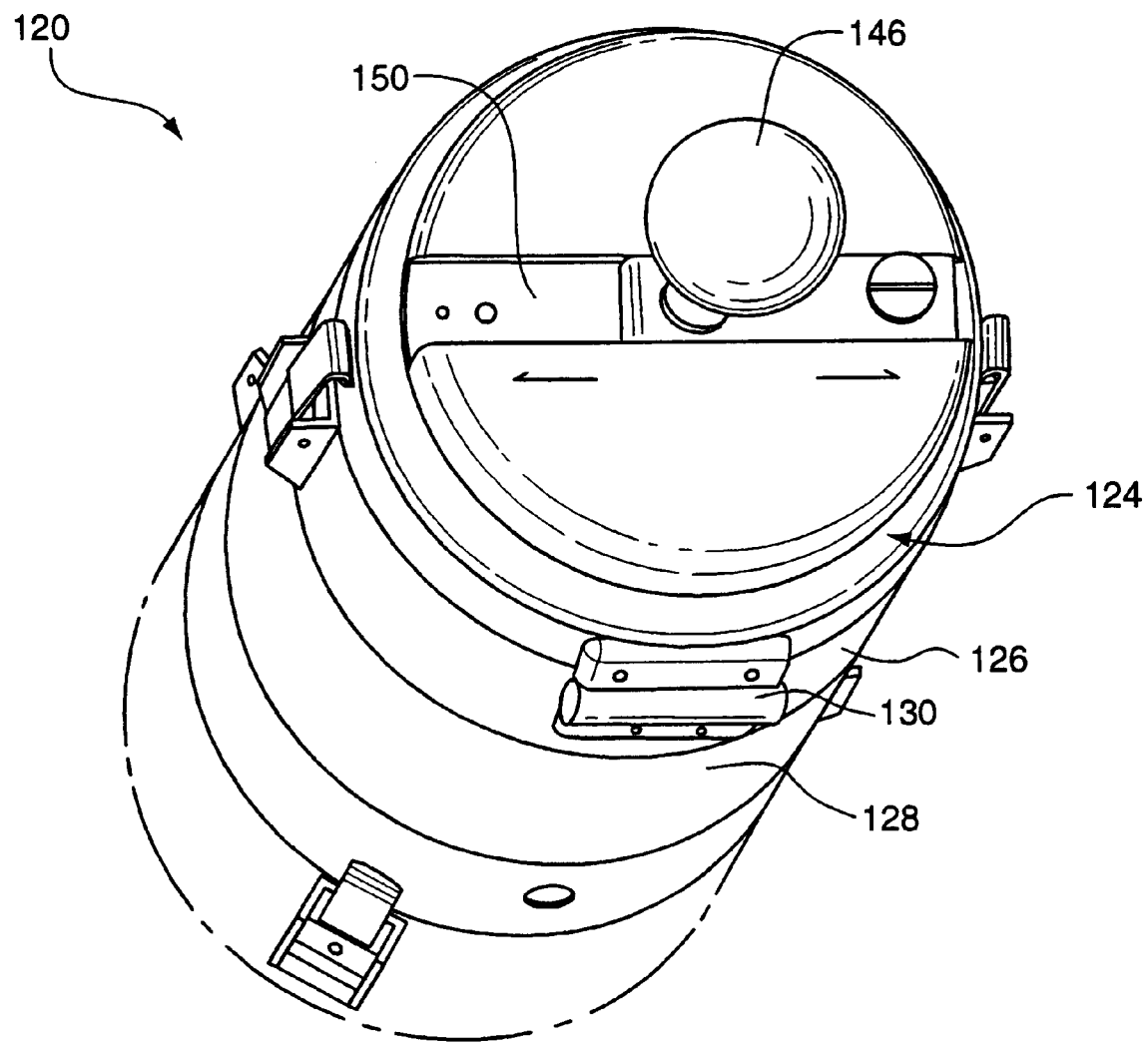
FIG. 13 is a top perspective view of the embodiment illustrated in FIG. 12.
Figure 14:
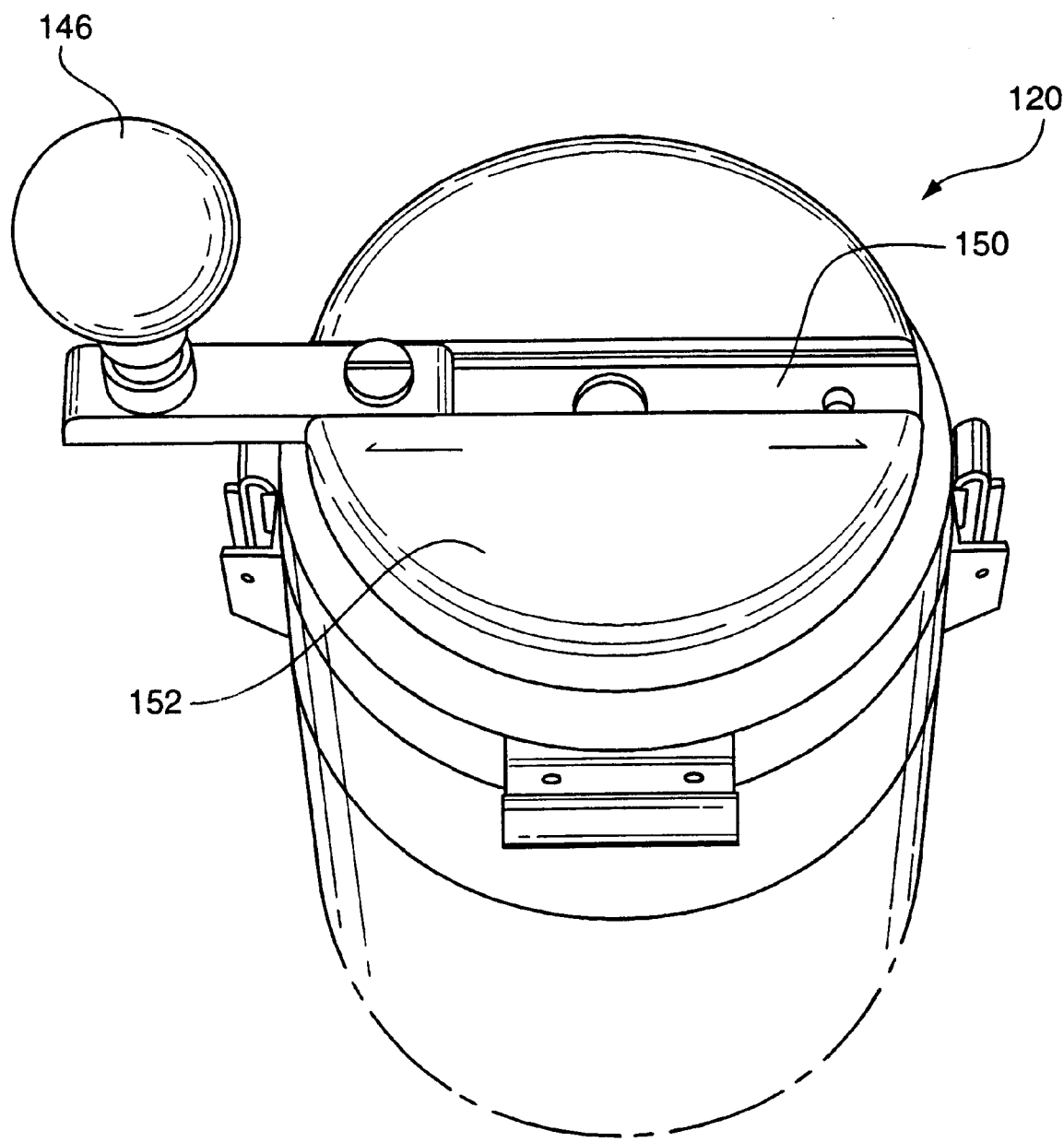
FIG. 14 is a top perspective view similar to that of FIG. 13 but illustrating the invention in manual operational position.
Figure 15:
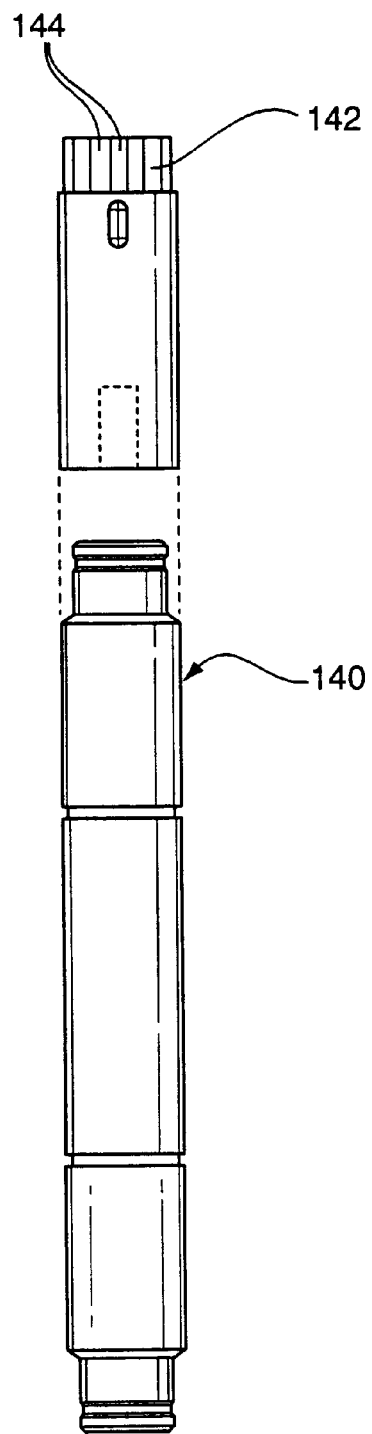
FIG. 15 is a side view of the central shaft, with parts in elevation, utilized in the second embodiment of the invention as illustrated in FIGS. 11 and 12.
Figure 16:
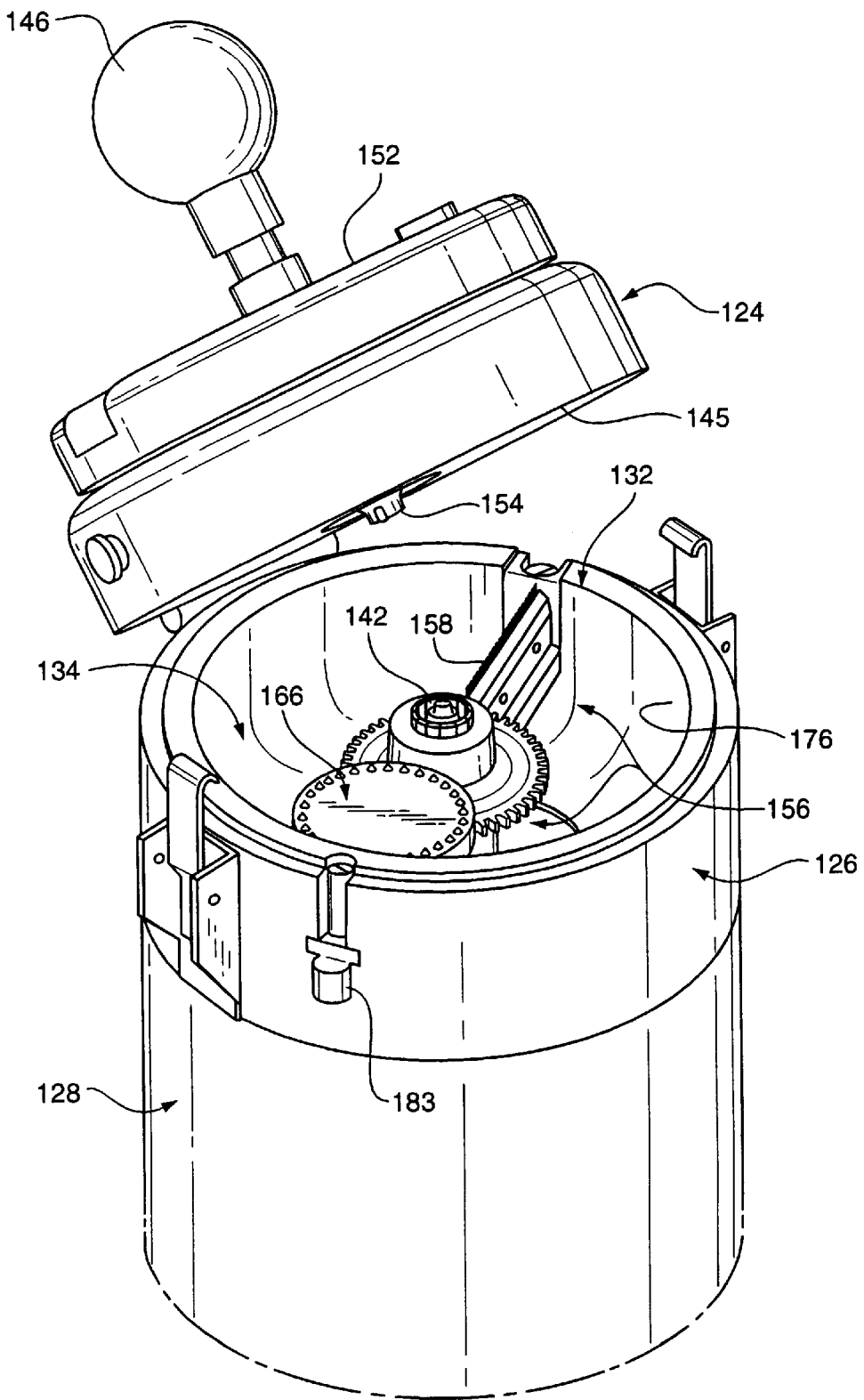
FIG. 16 is a top perspective view similar to that of FIG. 13 but illustrating the cover housing portion in its open, unsecured position.
Figure 17:
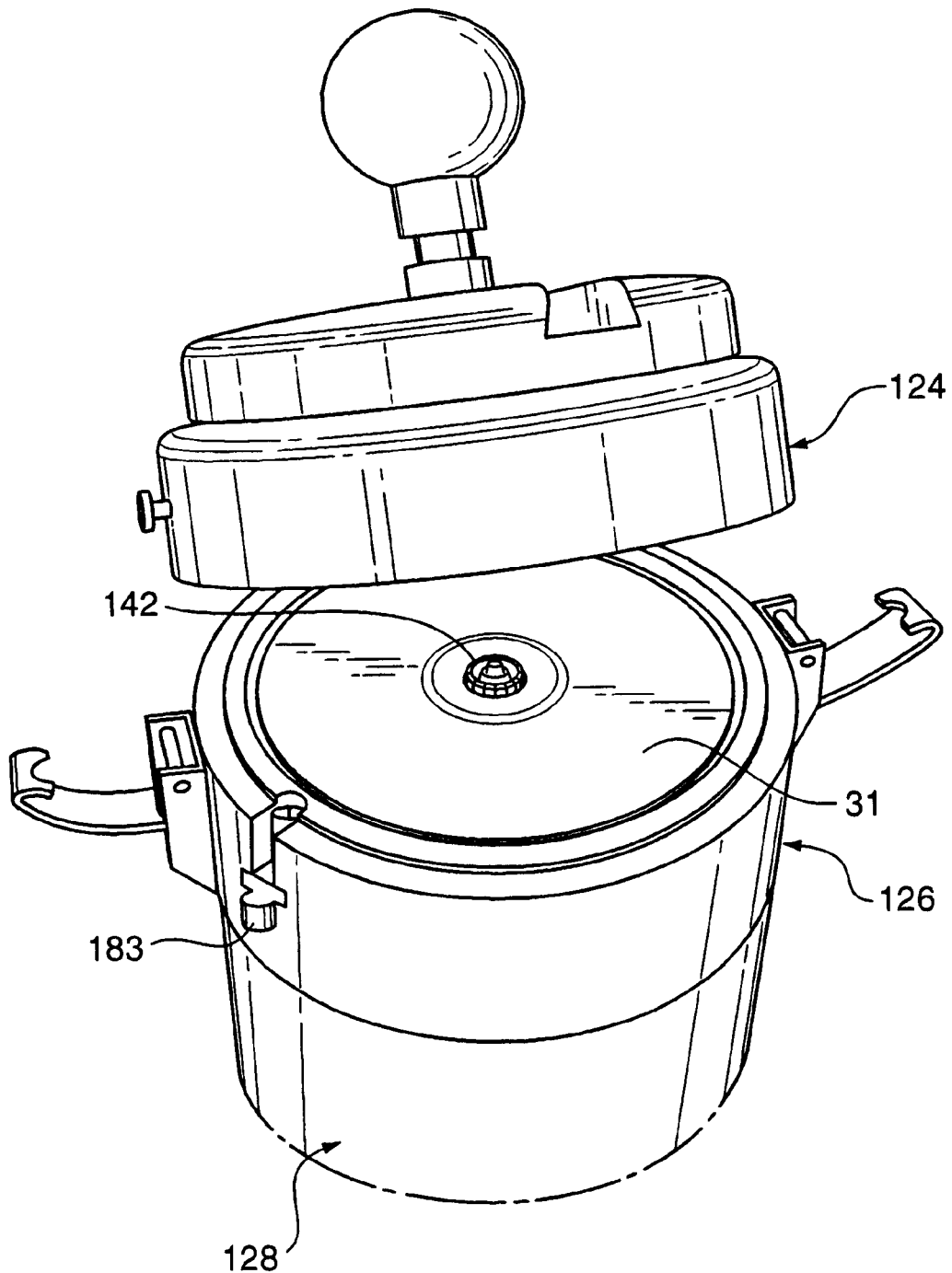
FIG. 17 is another view similar to that of FIG. 16 but illustrating a compact disc in position within the device of the invention.
Figure 18:
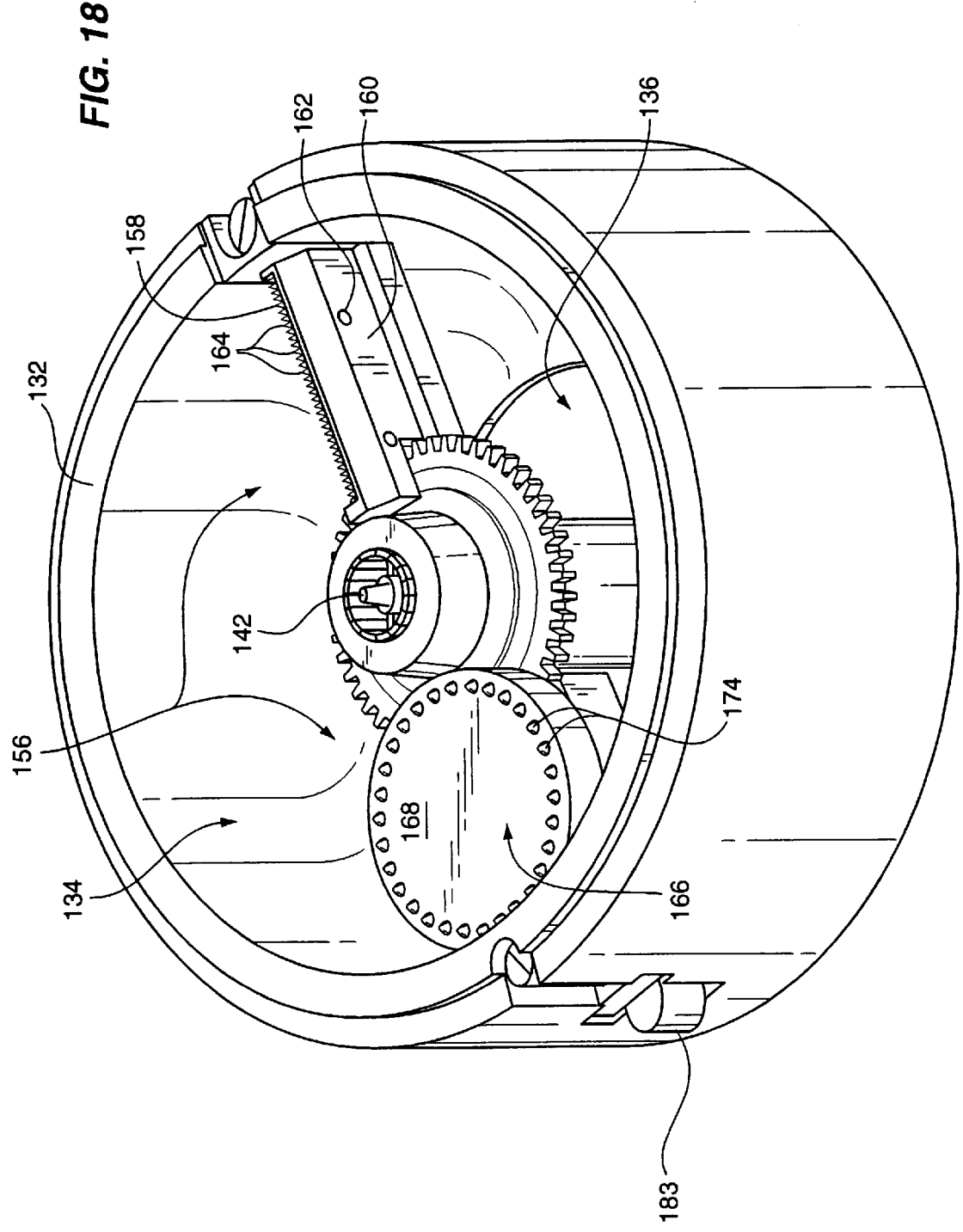
FIG. 18 is an enlarged perspective view of the first housing portion of the invention and illustrating another embodiment of the IBS removal mechanism contained therein.
Figure 19:
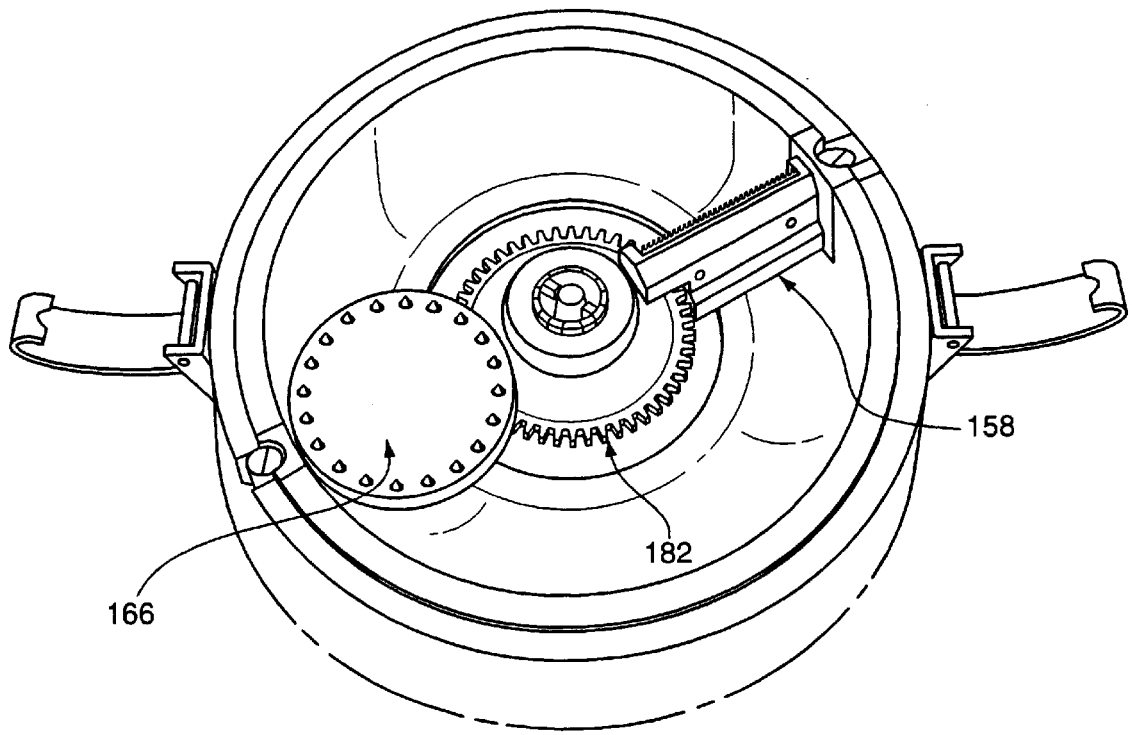
FIG. 19 is a top perspective view of the embodiment of the invention illustrated in FIG. 18.
Figure 20:
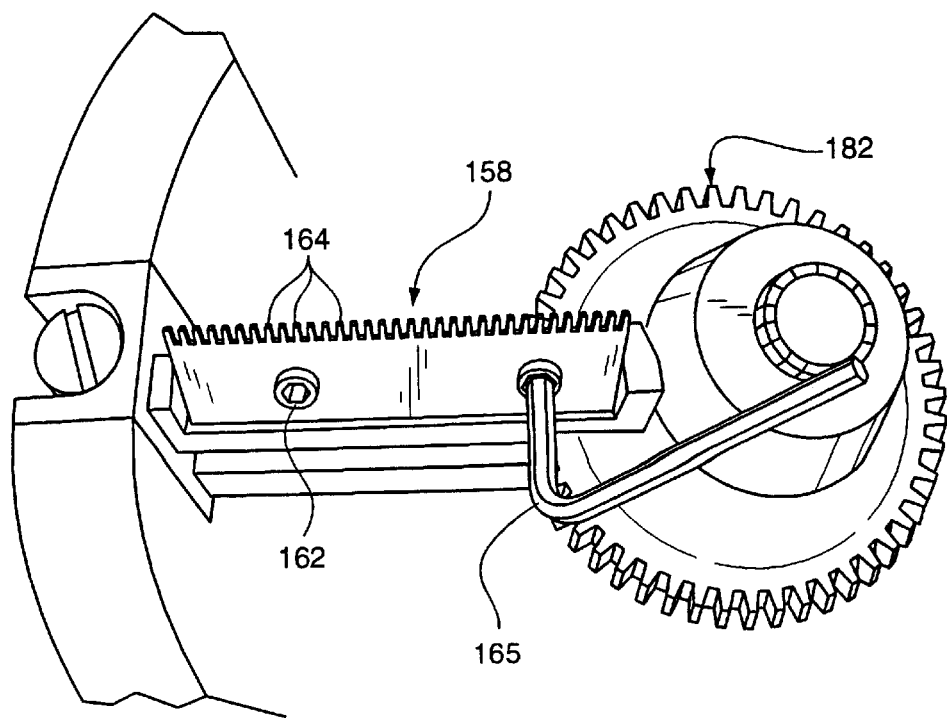
FIG. 20 is an enlarged top perspective view of one portion of the IBS removal mechanism contained in the embodiment illustrated in FIG. 19.
Figure 21:
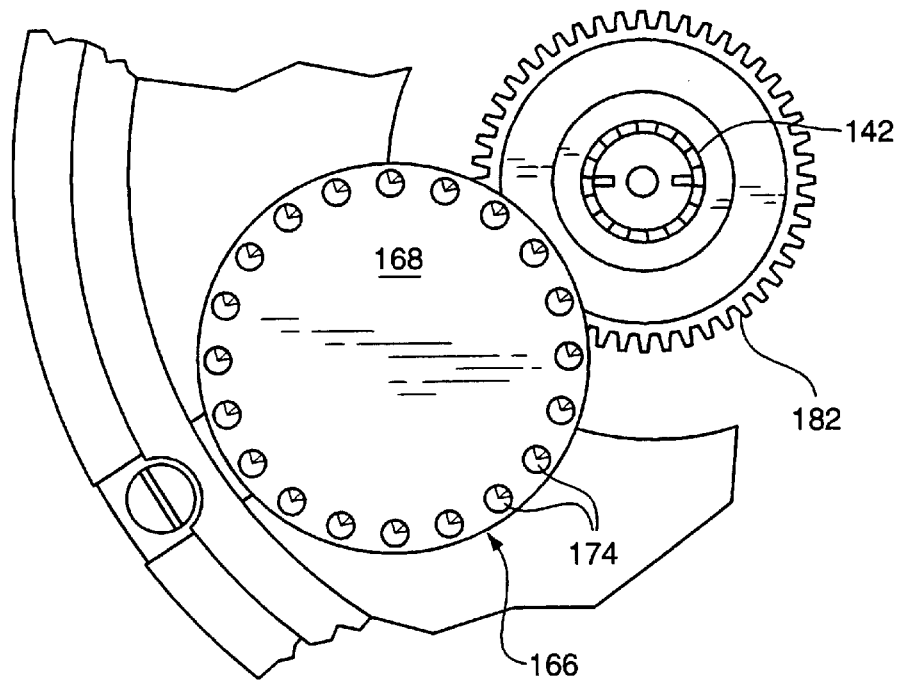
FIG. 21 is an enlarged top perspective view of a second portion of the IBS removal mechanism contained in the embodiment illustrated in FIG. 19.
Figure 22:
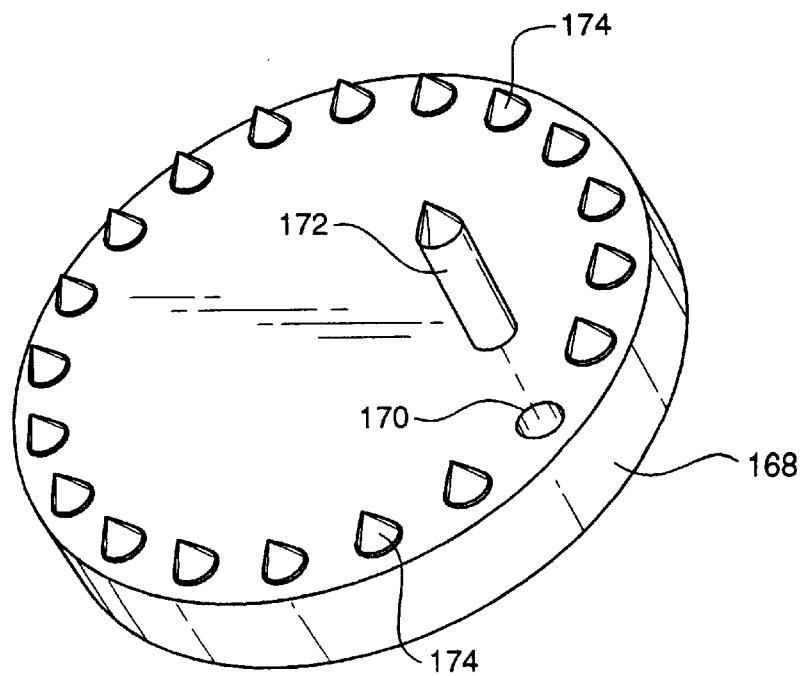
FIG. 22 is an enlarged view of the second portion of the IBS removal mechanism illustrated in FIG. 21 but showing the individual components thereof.
Figure 23:
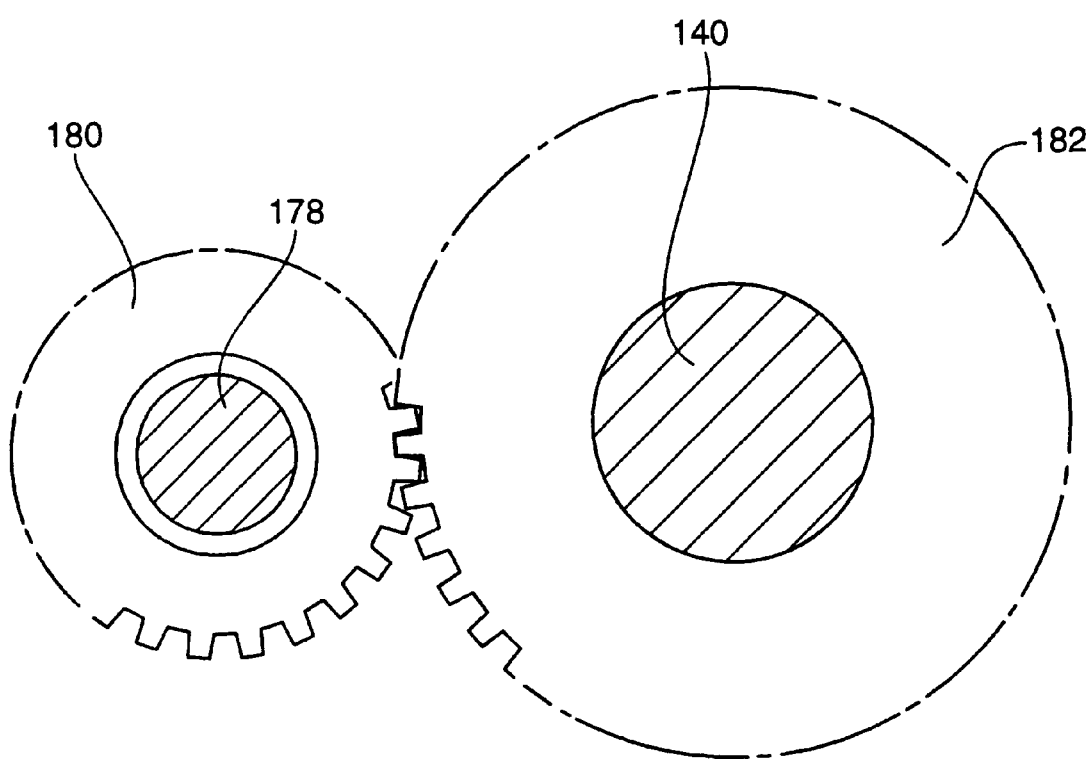
FIG. 23 is an enlarged view of one embodiment of the driving mechanism for the second portion of the IBS removal mechanism contained in the embodiment illustrated in FIGS. 21 and 22.
Figure 24:
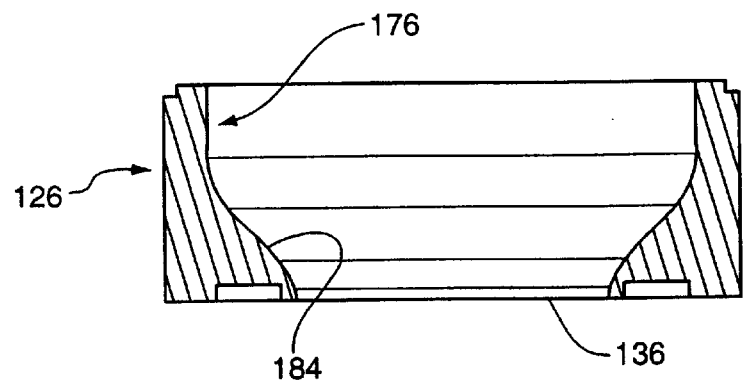
FIG. 24 is a side sectional view of the first housing portion defining the first cavity chamber of the second embodiment of the present invention.
Figure 25:
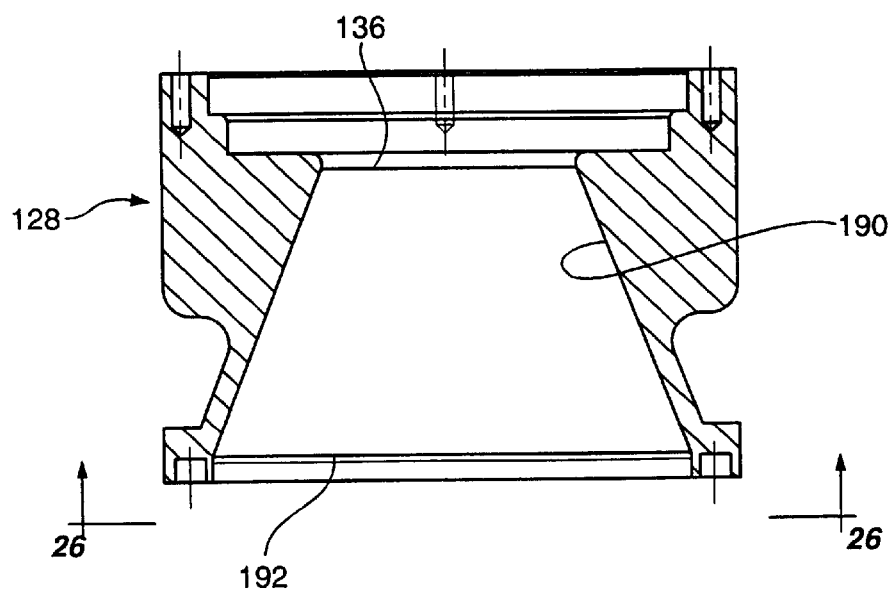
FIG. 25 is a side sectional view of the third housing portion defining the second cavity chamber of the second embodiment of the present invention.
Figure 26:
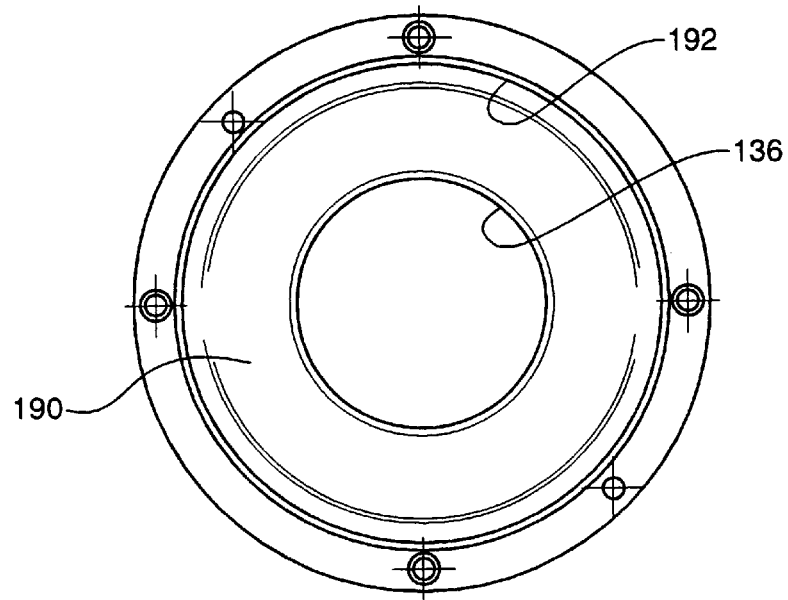
FIG. 26 is a bottom view taken substantially along line 26—26 of FIG. 25 illustrating the grinding surface of the second cavity chamber of the second embodiment of the present invention.
Figure 27:
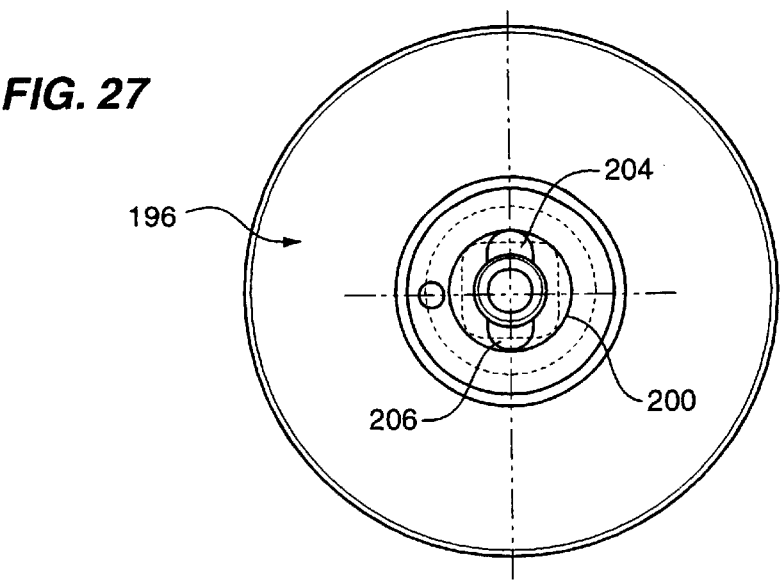
FIG. 27 is a top view of one embodiment the grinding element useful in the second cavity chamber of the second embodiment of the present invention as illustrated in FIGS. 25 and 26 and as taken substantially along line 27—27 of FIG. 28.
Figure 28:
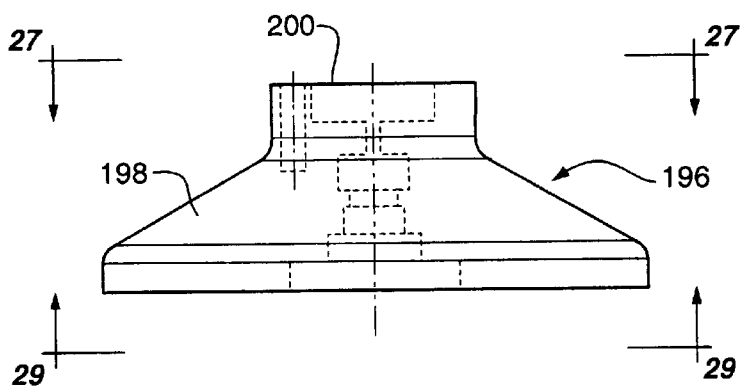
FIG. 28 is a side view of the embodiment the grinding element useful in the second cavity chamber of the second embodiment of the present invention as illustrated in FIGS. 25 and 26.
Figure 29:
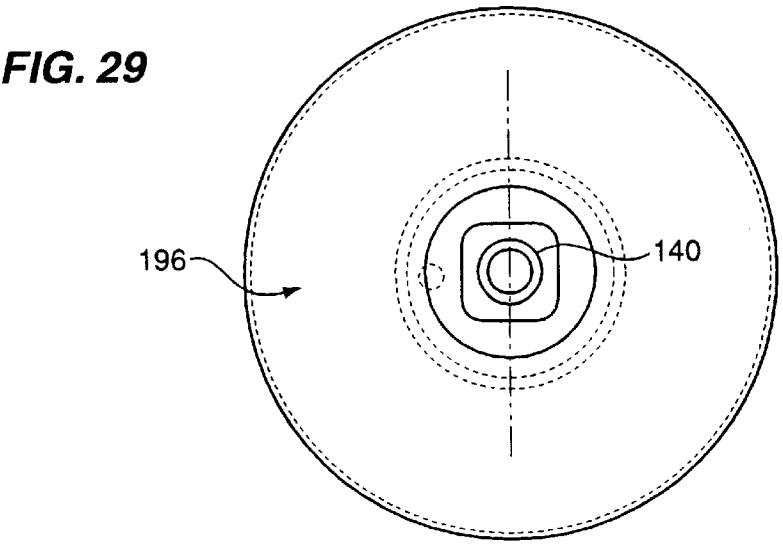
FIG. 29 is a bottom view of the embodiment illustrated in FIG. 28 and as taken substantially along line 29—29 of FIG. 28.
Figure 30:
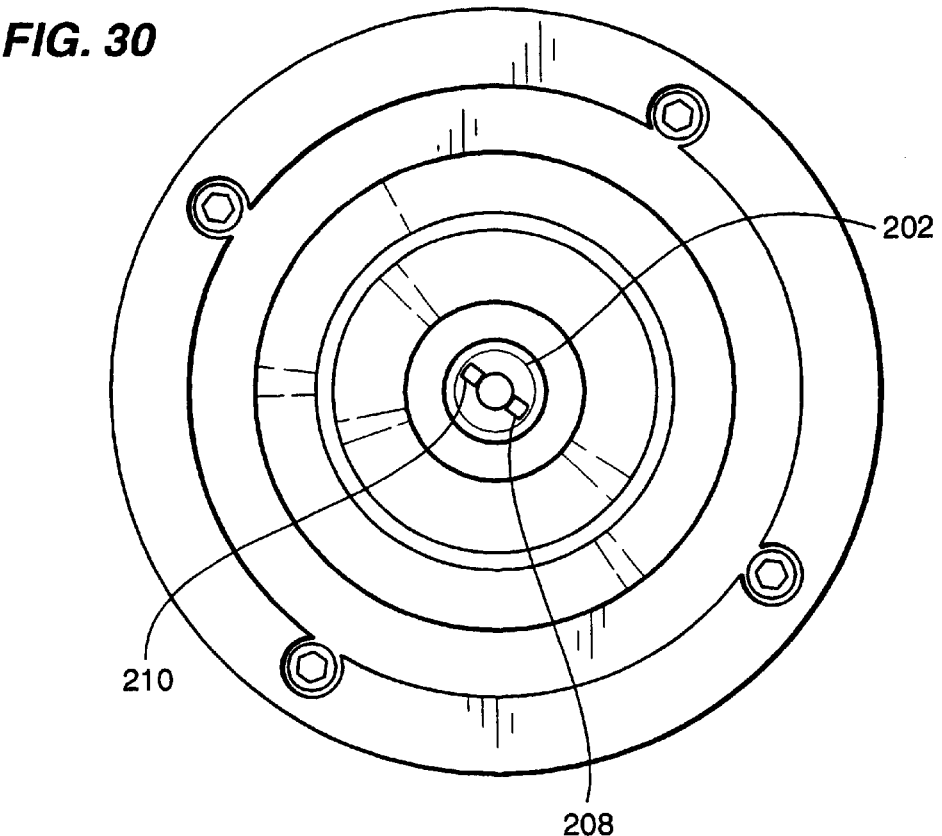
FIG. 30 is a bottom view of the second housing portion of the second embodiment of the present invention as illustrated in FIG. 25 but with the connection to the grinding element of FIGS. 27–29 positioned therewithin.
Figure 31:
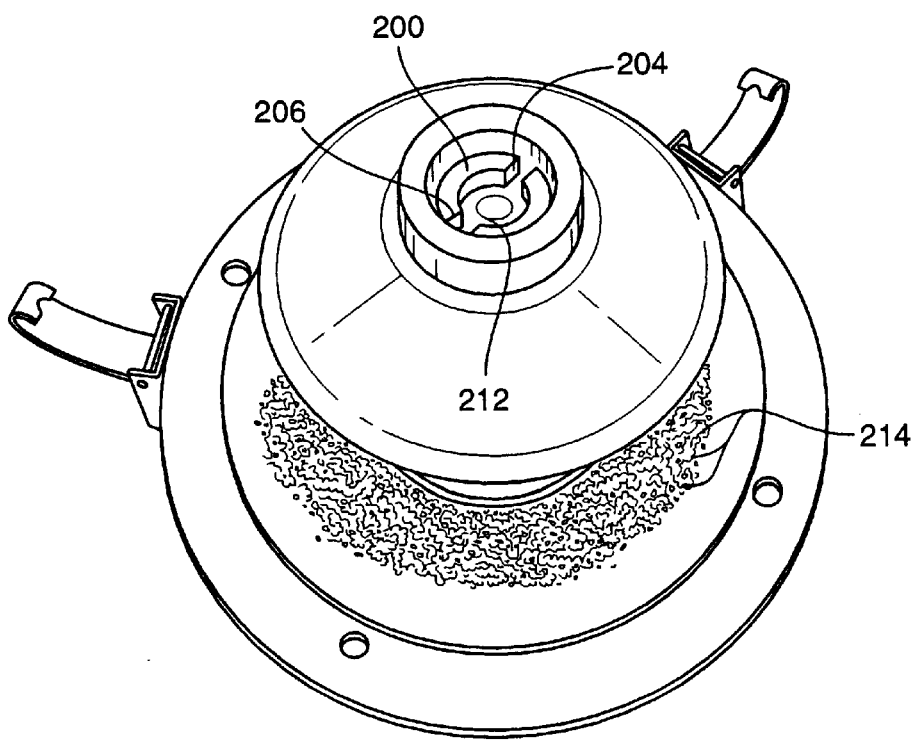
FIG. 31 is a top perspective view of the grinding element of FIGS. 27–29 positioned on the shaft of the invention but with the third housing portion removed.
Figure 32:
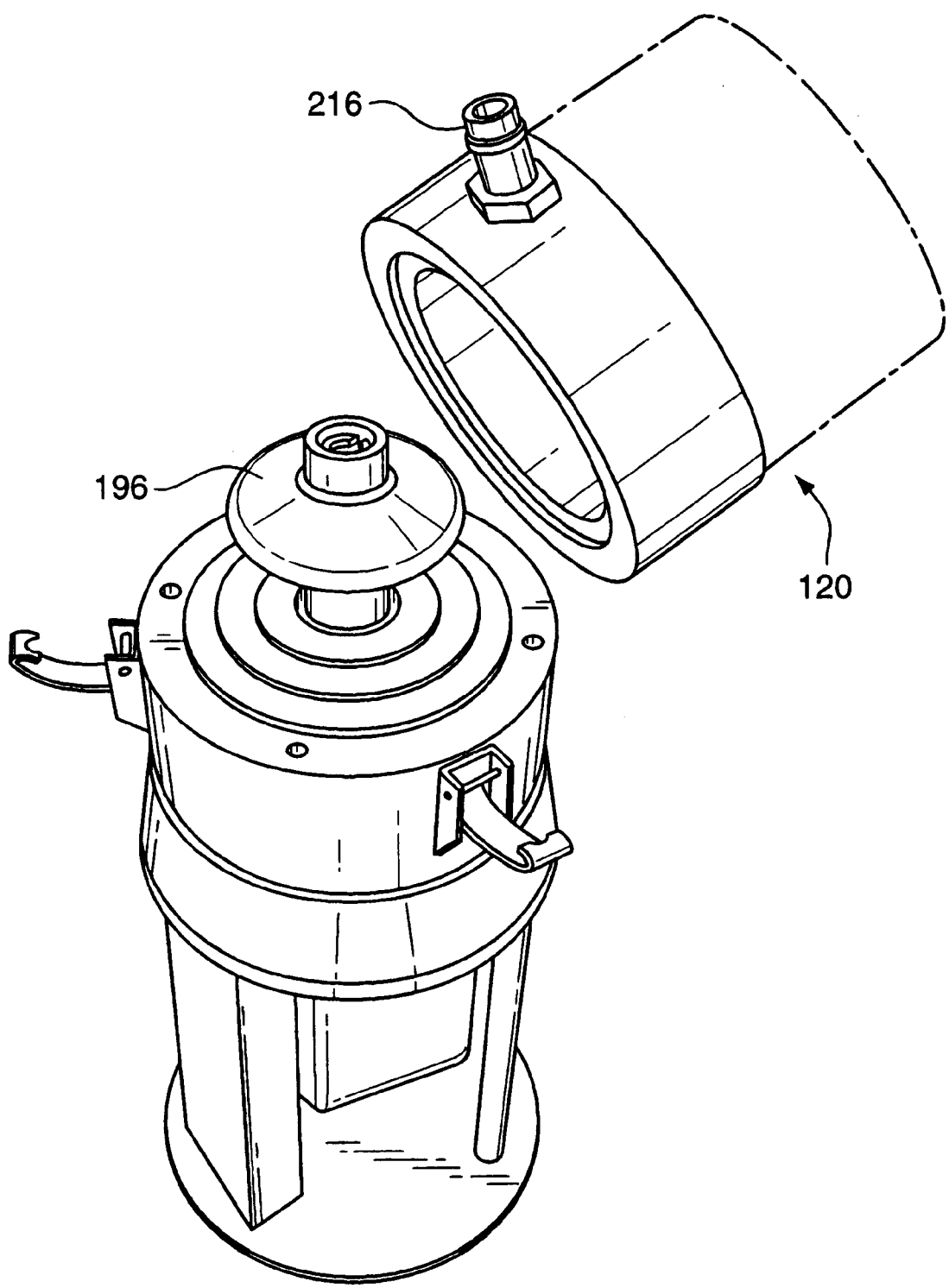
FIG. 32 is a side perspective view similar to that of FIG. 31 but illustrating the positioning of the first, second and third housing portions onto the mounted grinding element of the second embodiment of the invention.

Once the compact disc 31 is positioned within the first chamber 134 with the first and second housing portions secured together, the shaft 140 is rotated to engage the abrasion mechanism with the IBS layer of the compact disc. This rotation of the shaft 140 may be carried out by the motor 144 when electric power is available. The shaft 140 may also be rotated by the hand crank 146. When automatic rotation of the shaft 140 by the motor is desired, the hand crank 146 is positioned as illustrated in FIGS. 11–13. When it is desired to operate the device 120 in its manual mode, the hand crank 146 is moved laterally along a groove 150 disposed in the exterior surface 152 of the first housing portion 124 as illustrated in FIG. 14. The shaft 140 is secured to the crank 146 through the distal end 142 as well as a connector member 154 disposed at the center portion of the interior surface 146. In this manner, the operator of the hand crank 146 in its manual mode has sufficient leverage to easily rotate the crank 146 clockwise which in turns rotates the shaft 140 and the compact disc 31.

Referring now in particular to FIGS. 12, 16 and 18–23, the abrasion mechanism 156 of the present embodiment is illustrated in detail. In preferred form, the abrasion mechanism 156 involves two independent components. The first component is a removable scraping element 158 which is attached to a fixed mounting block 160 by a plurality of attachment members 162, such as screws or the like. The scraping element 158 includes a plurality of teeth or serrated members 164 which are designed to scrape the IBS surface of the compact disc 31 to remove some of the material as well as to loosen the adjacent material as the compact disc 31 is rotated by the shaft 140. The fixed mounting block 160 is positioned within the first chamber 134 between the shaft 140 and the inner surface 176 of the chamber 134. A tool 165 may be utilized to remove the screws 162 and to change out the scraping element 158 when its teeth or serrated members 164 become worn.

The other component of the abrasion mechanism 156 is a grinding disc member 166 which includes an annular disc support 168 containing a plurality of apertures 170 which are sized and shaped to receive a plurality of grinding elements 172 having grinding heads 174. The elements 172 are replaceably positioned within the apertures 170 such that the grinding heads 174 project outwardly from the surface of the disc support 168. The grinding disc member 166 is positioned within the first chamber 134 between the shaft 140 and the inner surface 176 opposite the scraping element 158. The disc support 168 is mounted to a spindle 178 for rotation thereon. The spindle 178 is attached to a first gear member 180 which in turn is intermeshed with a second gear member 182. The gear member 182 is mounted about the shaft 140. Therefore, when the shaft 140 is rotated clockwise, the disc support 168 is rotated counterclockwise by the interaction of the gear members 180 and 182 and biased upwardly by pressing member 183. In this manner, the grinding heads 174 rotate against the IBS surface of the compact disc 31 as the compact disc 31 is rotated within the first chamber 134. The combined effects of the scraping element 158 with the grinding heads 174 remove the IBS layer from the substrate layer of the compact disc 31 in the form of fine particulate material which falls to the bottom of the first chamber 134. In one form of the invention, this abrasion mechanism 156 is sufficient to reduce the IBS layer to particulate material of sufficiently small size that the material may be discarded from the chamber 134. However, in many highly sensitive matters, the particulate material must be further reduced in size.

Referring now to FIGS. 11, 12 and 24–32, the third housing portion 128 defines the second chamber 138. The first chamber 134 is more particularly defined by the inner wall or surface 176, which narrows down at 184 to a narrow opening 136. The second chamber 138 includes an upper portion 186 and a lower portion 188, with the upper portion 186 being defined by a substantially conically-shaped inner surface which terminates at its uppermost end at the narrowed opening 136 and at its lowermost end in an enlarged opening 192. The lower second chamber portion 188 is defined by a substantially cylindrically-shaped surface 194 which has the same diameter as the opening 192, the surface 194 preferably being contiguous with the conical surface 190. The second chamber communicates with the first chamber through the opening 136.

In preferred form, a rotatable grinding element 196 is disposed within the second chamber upper portion 186 and is secured to the shaft 140 for rotation therewith. The grinding element 196 is sized and shaped to closely fit within the upper portion 186 so that particulate material from the first chamber 134 can be ground down to micron-size pieces by grinding motion between the outer surface 198 of the grinding element 196 and the interior surface 190 of the housing 128. In preferred form, the grinding element 196 is conically shaped to match the shape of the surface 190. The grinding element 196 is secured to the shaft 140 by interconnection between the top 200 of the element 196 and the shaft portion 202 placed in the second housing portion 126. This interconnect point includes a pair of openings 204, 206 in the top 200 and a pair of cam members 208, 210. The cam members turn within a slot 212 as the shaft 140 and the grinding element 196 rotate, and this movement causes the grinding element 196 to move axially in a reciprocating manner within the upper portion 186 of the second chamber 138. This axial reciprocating movement creates a slight vacuum to draw particulate material from within the first chamber 134 created by the abrasion mechanism 156 into the second chamber 138 to further reduce the size of the particulate material 214 to well below the 250 micron size.

Once the particulate material 214 has been created after grinding by the grinding element 196, it is collected in the lower portion 188 of the second chamber 138. When it is desired, the fine particulate material 214 may be removed by attaching a vacuum source to the tube or hose connection 216 to then suck all the particulate material 214 from the lower portion 188. Since the device 120 may destroy the IBS layers of upward to 30–50 or more compact discs before the device 120 need be emptied through the hose connection 216, this mixing of micron-size particulate material provides even greater degree of security to the device 120.

The hand crank version of the present invention in either embodiment provides complete field portability for such a security device, while the motorized version provides field portability with only a slightly greater complexity. In either instance, however, the present invention is nonetheless completely field portable and therefore useful in a wide variety of situations where a larger machine or device would not effectively operate. In addition, the efficiency of the present invention enables rapid destruction of compact disc data and information for emergency security needs and purposes, requiring only 10 seconds to completely render a compact disc securely destroyed. This is all accomplished in an environmentally safe process where the resultant particulate dust can be readily vacuumed out of the device and vented to the atmosphere. Thus, sensitive and confidential information can be accumulated in substantial amounts on compact discs, yet they are readily declassifable in short order simply by utilizing the present invention. Moreover, the substrate layers of the compact discs are retained intact for either recycling use or to identify the complete destruction of the compact disc for security purposes.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

We claim:

1. A device for removing the information bearing surface and the data carried thereby from the substrate layer of a compact disc, said device comprising:

a housing including a first portion having an inner surface defining a first chamber, and a second portion selectively securable to said first portion to enclose said first chamber;

means for selectively mounting a compact disc within said chamber;

means disposed within said chamber for removing the information bearing surface from the substrate layer of a compact disc positioned on said mounting means by physically reducing said information bearing surface to particulate material;

means for biasing said removal means against the information bearing surface of a compact disc positioned on said mounting means as said information bearing surface is reduced to particulate material; and means for actuating said physical removal means.

2. The device as claimed in claim 1, wherein said housing includes a third portion defining a second chamber contiguous with said first chamber, said second chamber including means for reducing the size of said particulate material to 250 microns or less.

3. The device as claimed in claim 2, wherein said second chamber includes an upper portion for containing said particulate size reduction means and a lower portion for collecting the reduced size particulate material.

4. The device as claimed in claim 3, wherein said second chamber upper portion includes an annular interior surface and a rotatable grinding element sized to trap and grind particulate material from said first chamber against said annular interior surface.

5. The device as claimed in claim 4, wherein the annular interior surface of said second chamber upper portion is substantially conically-shaped and terminates at one end in a narrowed central opening communicating with said first chamber and at a second opposite end in an enlarged opening communicating with said second chamber lower portion, wherein said second chamber lower portion is substantially cylindrically-shaped, and wherein said grinding element is substantially conically-shaped and sized to grind particulate material against the substantially conically-shaped annular interior surface of said upper portion.

6. The device as claimed in claim 5, wherein said particulate reduction means includes cam means for axially moving said conical grinding element in a reciprocal manner during rotation thereof to create a partial vacuum to draw particulate material from said first chamber into said second chamber and against said grinding element.

7. The device as claimed in claim 2, wherein said second chamber is defined by first and second contiguous interior surfaces, said first surface being substantially conically-shaped and terminating at one end in a narrowed central opening communicating with said first chamber and at a second opposite end in an enlarged opening, and said second surface being substantially cylindrically-shaped and adjoining the enlarged opening of said conically-shaped surface to form a substantially bullet-shaped second chamber.

8. The device as claimed in claim 1, wherein said removal means comprises a disc grinding element and a serrated scraping element mounted for bias engagement against the information bearing surface of a compact disc during the removal thereof.

9. The device as claimed in claim 8, wherein said biasing means comprises an interior surface of said second housing portion when it is selectively secured to said first housing portion.

10. The device as claimed in claim 1, wherein said physical removal means comprises an independently rotatable head assembly carrying a plurality of grinding elements and a serrated scraping member, both being disposed within said first chamber and mounted for bias against the information bearing surface of a compact disc.

11. The device as claimed in claim 10, wherein said device further includes a shaft disposed axially within said housing for rotation therewithin, and wherein said compact disc mounting means comprises the distal end of said shaft disposed for rotation within said housing first portion in response to said actuation means, said head assembly being disposed in radially spaced relation to said shaft for separate rotation relative thereto.

12. The device as claimed in claim 11, wherein said housing first portion includes gear means adapted to rotate said head assembly in one direction and wherein said shaft is adapted to rotate a mounted compact disc in the opposite direction to maximize the abrasive action of said grinding elements against the information bearing surface of the compact disc.

13. The device as claimed in claim 12, wherein said actuation means comprises means for rotating said shaft.

14. The device as claimed in claim 13, wherein said actuation means comprises a hand actuated crank member disposed proximate an exterior surface of said second housing portion.

15. The device as claimed in claim 13, wherein said actuation means comprises a motor member.

16. The device as claimed in claim 1, wherein said device is field portable.

17. A device for removing the information bearing surface and the data carried thereby from the substrate layer of a compact disc while maintaining the integrity and identification of the substrate layer, said device comprising:

a housing defining a central cavity, said housing including a first portion defining a first cavity chamber, a second portion having an interior surface and selectively attachable to said first portion to enclose said interior surface within said cavity chamber, said interior surface being sized and shaped to engage a compact disc, and a third portion defining a second cavity chamber contiguous with said first chamber;

means for selectively mounting a compact disc within said first chamber;

means disposed within said first chamber for physically removing the information bearing surface of a compact disc positioned on said mounting means by reducing it to particulate material;

means for biasing said physical removal means against the information bearing surface of a compact disc positioned on said mounting means as said information bearing surface is reduced to particulate material;

means disposed in said second chamber for reducing the size of said particulate material to 250 microns or less; and means for actuating said physical removal means.

18. The device as claimed in claim 17, wherein said second cavity chamber includes an upper portion for containing said particulate material size reduction means and a lower portion for collecting the reduced size particulate material.

19. The device as claimed in claim 18, wherein said physical removal means comprises an independently rotatable head assembly carrying a plurality of grinding elements and a serrated scraping member, both being disposed within said first chamber and mounted for bias against the information bearing surface of a compact disc.

20. The device as claimed in claim 19, wherein said device further includes an axially aligned shaft disposed for rotation within said housing, and wherein said compact disc mounting means comprises the distal end of said shaft disposed within said first chamber in response to said actuation means, said head assembly being disposed in radially spaced relation to said shaft for rotation relative thereto.

21. The device as claimed in claim 18, wherein said second chamber upper portion includes an annular interior surface, and said particulate size reduction means comprises a rotatable grinding element sized and shaped to trap and grind particulate material from said first chamber against said annular interior surface.

22. The device as claimed in claim 18, wherein said second chamber upper and lower portions are defined, respectively, by first and second contiguous interior surfaces, said first surface being substantially conically-shaped and terminating at one end in a narrowed central opening communicating with said first chamber and at a second opposite end in an enlarged opening, and said second surface being substantially cylindrically-shaped and adjoining the enlarged opening of said conically-shaped surface to form a substantially bullet-shaped second chamber, said particulate material size reduction means comprising a rotatable substantially conically-shaped grinding element sized and shaped to trap and grind particulate material from said first chamber against said first interior surface.

23. The device as claimed in claim 22, wherein said particulate material size reduction means includes a cam for axially moving said conical grinding element in a reciprocal manner during rotation thereof to create a partial vacuum to draw particulate material from said first chamber into said second chamber and against said grinding element.

24. The device as claimed in claim 17, wherein said actuation means comprises a mechanically actuated crank member disposed proximate the exterior of said second housing portion.

25. The device as claimed in claim 17, wherein said actuation means comprises an electric motor member.

26. A device for the complete declassification of compact discs by the removal of information bearing layers therefrom, said device comprising:

a first housing portion defining a first central cavity therewithin and having open first and second ends;

a second housing portion including an interior surface sized and shaped to engage a compact disc, said second housing portion being removably securable across the open first end of said first housing portion for selectively covering said open first end to enclose said interior surface within said first central cavity;

a third housing portion operatively secured to the open second end of said first housing portion and defining a second central cavity contiguous with said first central cavity;

means for selectively mounting a compact disc within said first central cavity;

means disposed within said first central cavity for physically removing the information bearing layer in the form of particulate material from the substrate layer of a compact disc mounted within said first central cavity;

means for continuously biasing said removal means against the information bearing layer of a compact disc mounted within said first central cavity until said information bearing layer is converted to particulate material; and means for actuating said removal means.

27. The device as claimed in claim 26, wherein said device further includes a central shaft disposed axially through said housing portions for rotation therewithin in response to said actuation means, said compact disc mounting means comprising the distal end of said shaft positioned within said first central cavity.

28. The device as claimed in claim 27, wherein said third housing portion includes grinding means secured to said shaft within said second central cavity adapted to reduce said particulate matter from said first central cavity to no greater than 250 microns in size.

29. The device as claimed in claim 28, wherein said second central cavity is defined by first and second contiguous interior surfaces, said first interior surface forming an upper portion containing said grinding means and being substantially conically-shaped to terminate at one end in a narrowed central opening communicating with said first central cavity and at a second opposite end in an enlarged opening, and said second interior surface forming a lower portion for collecting the reduced size particulate material and being substantially cylindrically-shaped and adjoining the enlarged opening of said conically-shaped surface, said grinding element being substantially conically-shaped and sized to grind particulate material against the substantially conically-shaped first interior surface of said upper portion.

30. The device as claimed in claim 27, wherein said physical removal means comprises a rotatable head assembly carrying a plurality of grinding elements disposed within said first central cavity and mounted for independent rotation relative to said shaft as well as for bias against the information bearing surface of a compact disc.

31. The device as claimed in claim 30, wherein said physical removal means further comprises a replaceable serrated scraping member disposed within said first central cavity spaced from said rotatable head assembly.

32. The device as claimed in claim 27, wherein said actuation means comprises a hand actuated crank member adapted to rotate said shaft.

33. The device as claimed in claim 27, wherein said actuation means comprises a motorized crank member adapted to rotate said shaft.

34. In a device for the destruction of information layers of a compact disc to prevent the recovery of exploitable information therefrom including a housing for containing the compact disc to be destroyed and means for destroying the information layers thereof, the improvement wherein said device comprises a housing member having means for selectively mounting a compact disc therewithin, means disposed within said housing for removing the information bearing surface from the substrate layer of a compact disc positioned within said housing by physically reducing said information bearing surface to particulate material, and means for biasing said removal means against the information bearing surface of a compact disc positioned on said mounting means as said information bearing surface is reduced to particulate material.

35. The improvement as claimed in claim 34, wherein said device destroys the information layers of compact discs while retaining the non-information bearing substrate layers thereof substantially in-tact.

36. The improvement as claimed in claim 34, wherein said housing includes a first portion defining a first chamber, a second portion having an interior surface and selectively attachable to said first portion to enclose said interior surface within said first chamber, said interior surface being sized and shaped to engage a compact disc, and a third portion defining a second chamber contiguous with said first chamber, wherein said removal means are disposed within said first chamber, and wherein said second chamber includes means for reducing the size of said particulate material to less than 250 microns.

37. The improvement as claimed in claim 36, wherein said second chamber includes an upper portion for containing said particulate size reduction means and a lower portion for collecting the reduced size particulate material, said size reduction means comprising a rotatable grinding element sized to trap and grind particulate material from said first chamber against the interior surface of said upper chamber portion.

38. A device for removing the information bearing surface and the data carried thereby from the substrate layer of a compact disc, said device comprising:

a housing including a first portion having an inner surface defining a first chamber, and a second portion selectively securable to said first portion to enclose said first chamber;

a mounting element for selectively securing a compact disc within said chamber;

an abrading assembly disposed within said chamber for removing the information bearing surface from the substrate layer of a compact disc positioned on said mounting means by physically converting said information bearing surface to particulate material;

a mechanism for biasing said abrading assembly against the information bearing surface of a compact disc positioned on said mounting means as said information bearing surface is reduced to particulate material; and an agent for actuating said abrading assembly.

39. A device for removing the information bearing surface and the data carried thereby from the substrate layer of a compact disc while maintaining the integrity and identification of the substrate layer, said device comprising:

a housing defining a central cavity, said housing including a first portion defining a first cavity chamber, a second portion having an interior surface and selectively attachable to said first portion to enclose said interior surface within said cavity chamber, said interior surface being sized and shaped to engage a compact disc, and a third portion defining a second cavity chamber contiguous with said first chamber;

a mounting element for selectively securing a compact disc within said first chamber;

an abrading assembly disposed within said first chamber for physically removing the information bearing surface of a compact disc positioned on said mounting means by reducing it to particulate material;

a mechanism for biasing said abrading assembly against the information bearing surface of a compact disc positioned on said mounting element as said information bearing surface is converted to particulate material;

a grinding member disposed in said second chamber for reducing the size of said particulate material to less than 250 microns; and an agent for actuating said abrading assembly.

40. In a device for the destruction of information layers of a compact disc to prevent the recovery of exploitable information therefrom including a housing for containing the compact disc to be destroyed and a mechanism for destroying the information layers thereof, the improvement wherein said device comprises a housing member having a mounting element for selectively securing a compact disc therewithin, an abrading assembly disposed within said housing for removing the information bearing surface from the substrate layer of a compact disc positioned within said housing by physically converting said information bearing surface to particulate material, and a mechanism for biasing said abrading assembly against the information bearing surface of a compact disc positioned on said mounting element as said information bearing surface is reduced to particulate material.

* * * * *